(12) United States Patent
Noborikawa et al.

(10) Patent No.: US 8,250,259 B2
(45) Date of Patent: Aug. 21, 2012

(54) METHOD OF SETTING COMMUNICATION PATH IN STORAGE SYSTEM, AND MANAGEMENT APPARATUS THEREFOR

(75) Inventors: Yoshiyuki Noborikawa, Odawara (JP); Koji Nagata, Kaisei (JP); Kosuke Sakai, Isehara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/369,975

(22) Filed: Feb. 9, 2012

(65) Prior Publication Data
US 2012/0151105 A1 Jun. 14, 2012

Related U.S. Application Data

(63) Continuation of application No. 12/311,421, filed on Mar. 30, 2009, now Pat. No. 8,140,720.

(51) Int. Cl.
G06F 3/00 (2006.01)
G06F 15/173 (2006.01)

(52) U.S. Cl. ............... 710/38; 710/36; 709/238; 340/2.1

(58) Field of Classification Search ........................ None
See application file for complete search history.

(56) References Cited

U.S. PATENT DOCUMENTS
6,173,377 B1 1/2001 Yanai et al.
(Continued)

FOREIGN PATENT DOCUMENTS
JP 2005-208906 8/2005
(Continued)

OTHER PUBLICATIONS

International Search Report dated May 19, 2009, in Japanese with English Written Opinion.

(Continued)

*Primary Examiner* — Henry Tsai
*Assistant Examiner* — Michael Sun
(74) *Attorney, Agent, or Firm* — Stites & Harbison, PLLC; Juan Carlos A. Marquez, Esq

(57) ABSTRACT

In a storage system having a plurality of storage apparatuses, each of the storage apparatuses stores therein a coupling mode that is information indicative of whether or not to permit setting of a communication path between each of the storage apparatuses and a plurality of other storage apparatuses. A management apparatus is provided to be coupled for communication to each of the storage apparatuses. The management apparatus has a communication path setting part that provides a user interface for setting the communication path. The communication path setting part does not permit setting of the communication path, at the time of setting the communication path, when the coupling modes of both of the storage apparatuses between which the communication path is to be set are set permissible.

10 Claims, 21 Drawing Sheets

U.S. PATENT DOCUMENTS

| | | |
|---|---|---|
| 6,266,797 B1 | 7/2001 | Godfrey et al. |
| 7,209,986 B2 * | 4/2007 | Ohno et al. ............... 710/74 |
| 2002/0107989 A1 | 8/2002 | Johnson et al. |
| 2005/0021627 A1 | 1/2005 | Achiwa et al. |
| 2005/0050288 A1 | 3/2005 | Takahashi et al. |
| 2005/0220038 A1 | 10/2005 | Muto et al. |
| 2005/0281251 A1 | 12/2005 | Yumoto et al. |
| 2006/0021057 A1 | 1/2006 | Risan et al. |
| 2006/0069889 A1 | 3/2006 | Nagaya et al. |
| 2006/0184809 A1 | 8/2006 | Kojou et al. |
| 2006/0265515 A1 * | 11/2006 | Shiga et al. ............... 709/238 |
| 2007/0198656 A1 | 8/2007 | Mazzaferri et al. |
| 2007/0233992 A1 | 10/2007 | Sato |
| 2008/0186963 A1 * | 8/2008 | Trasi et al. ............... 370/389 |
| 2008/0276016 A1 * | 11/2008 | Fujibayashi ............... 710/36 |
| 2008/0304494 A1 | 12/2008 | Yokoyama |

FOREIGN PATENT DOCUMENTS

| | | |
|---|---|---|
| JP | 2006-099440 | 4/2006 |
| JP | 2007-028474 | 2/2007 |
| JP | 2008-262600 | 7/2008 |

OTHER PUBLICATIONS

Office Action, from Japanese Patent Office, issued in corresponding Japanese Patent Application No. 2010-549333, mailed Apr. 17, 2012, pp. 1-3.

* cited by examiner

STORAGE APPARATUS 10

PATH DEFINING TABLE 500

| LOCAL | | REMOTE | |
|---|---|---|---|
| APPARATUS ID | PORT ID | APPARATUS ID | PORT ID |
| 00001 | 01 | 00011 | 01 |
| 00001 | 02 | 00011 | 02 |
| 00001 | 03 | 00011 | 03 |
| 00001 | 04 | 00011 | 04 |
| 00001 | 05 | 00011 | 05 |
| 00002 | 01 | 00012 | 01 |
| 00002 | 02 | 00012 | 02 |
| 00002 | 03 | 00012 | 03 |
| ... | ... | ... | ... |

FIG. 5

COUPLING MODE INFORMATION 600

ENCRYPTION INFORMATION 700

REPLICATION PAIR DEFINING TABLE 800

| REPLICATION SOURCE LU ||| REPLICATION TARGET LU |||
| --- | --- | --- | --- | --- | --- |
| APPARATUS ID | PORT ID | LUN | APPARATUS ID | PORT ID | LUN |
| 00001 | 01 | 01 | 00011 | 01 | 01 |
| 00001 | 01 | 02 | 00011 | 01 | 02 |
| 00001 | 01 | 03 | 00011 | 01 | 03 |
| 00001 | 01 | 04 | 00011 | 01 | 04 |
| 00001 | 01 | 05 | 00011 | 01 | 05 |
| 00001 | 02 | 01 | 00011 | 02 | 01 |
| 00001 | 02 | 02 | 00011 | 02 | 02 |
| 00001 | 02 | 03 | 00011 | 02 | 03 |
| ... | ... | ... | ... | ... | ... |

Columns: 811, 812, 813, 814, 815, 816

FIG. 8

REPLICATION PAIR SETTING SCREEN

| REPLICATION SOURCE LU | | | REPLICATION TARGET LU | | | DELETE |
|---|---|---|---|---|---|---|
| APPARATUS ID | PORT ID | LUN | APPARATUS ID | PORT ID | LUN | |
| 00001 | 01 | 01 | 00011 | 01 | 01 | ☐ |
| 00001 | 01 | 02 | 00011 | 01 | 02 | ☐ |
| 00001 | 01 | 03 | 00011 | 01 | 03 | ☐ |
| 00001 | 01 | 04 | 00011 | 01 | 04 | ☐ |
| 00001 | 01 | 05 | 00011 | 01 | 05 | ☑ |
| 00001 | 02 | 01 | 00011 | 02 | 01 | ☐ |
| 00001 | 02 | 02 | 00011 | 02 | 02 | ☐ |
| 00001 | 02 | 03 | 00011 | 02 | 03 | ☐ |

SET  CANCEL

FIG. 20

METHOD OF SETTING COMMUNICATION PATH IN STORAGE SYSTEM, AND MANAGEMENT APPARATUS THEREFOR

CROSS-REFERENCE TO RELATED APPLICATIONS

This application is a Continuation of U.S. application Ser. No. 12/311,421 filed on Mar. 30, 2009. Priority is claimed based on U.S. application Ser. No. 12/311,421 filed on Mar. 30, 2009, which claims priority from PCT Application No. PCT/JP2009/052174 filed on Feb. 2, 2009, the content of which herein incorporated by reference.

TECHNICAL FIELD

The present invention relates generally to a method of setting a communication path in a storage system and to a management apparatus therefor, and, more particularly, to a technique of preventing configuration setting which may cause a deadlock when data replication management is carried out using a plurality of storage apparatuses.

BACKGROUND ART

Patent Citation 1 discloses a remote copy system that carries out data replication management (remote copy) superior in fault-tolerance at low cost, in which the remote copy system includes a first memory system coupled to a first superior computer system, a second memory system that is coupled to the first memory system to receive data from the first memory system, and a third memory system that is coupled to the second memory system to receive data from the second memory system and that is coupled to a second superior computer system to exchange data with the second superior computer system as well. The remote copy system reads data and updated information written on a second storage area from the third memory system after a lapse of a given time to write to a third storage area the data and updated information.
[Patent Citation 1]
Japanese Patent Application Laid-Open Publication No. 2006-099440

DISCLOSURE OF INVENTION

Technical Problem

In practical application of a storage system, a management tool for flexible setting of a coupling configuration, etc., of the storage apparatus is provided to carry out efficient operation and optimum arrangement of the storage apparatus or detailed responses to customer needs. By using the management tool, a user (operator) is able to carry out flexible and simple setting of data replication management, such as setting of the corresponding relation between a storage apparatus as a replication source and a storage apparatus as a replication target.

When data replication management is carried out using three or more storage apparatuses, an occurrence of a deadlock must be considered in setting a storage apparatus as a replication source and a storage apparatus as a replication target. That is, when a storage area of a first storage apparatus is determined to be a replication source while a storage area of a second storage apparatus is determined to be a replication target, and the storage area of the second storage apparatus is determined to be a replication source while a storage area of a third storage apparatus is determined to be a replication target, and the storage area of the third storage apparatus is determined to be a replication source while the storage area of the first storage apparatus is determined to be a replication target, the storage apparatuses have a possibility of getting into a state of a tripartite deadlock in which each of the storage apparatuses waits for the completion of data write of the replication sources, depending on timing of data writing to each of the storage apparatuses. Therefore, attention must be paid to avoid such a configuration setting as that described above when a storage apparatus as a replication source or a replication target is set.

The present invention has been conceived in view of the above problem, and it is therefore an object of the present invention to provide a method of setting a communication path in a storage system and a management apparatus therefor that can prevent configuration setting that causes a deadlock when data replication management is carried out using a plurality of storage apparatuses.

Technical Solution

In order to achieve the above object, according to an aspect of the present invention there is provided a method of setting a communication path between storage apparatuses in a storage system having a plurality of the storage apparatuses, the method comprising: storing in each of the storage apparatuses a coupling mode that is information indicative of whether or not to permit setting of the communication path between each of the storage apparatuses and a plurality of others of the storage apparatuses; communicatively coupling a management apparatus to each of the storage apparatuses; and providing the management apparatus with a communication path setting part that provides a user interface for setting the communication path, wherein, the communication path setting part does not permit setting of the communication path, at the time of setting the communication path, when the coupling modes of both of the storage apparatuses between which the communication path is to be set are set permissible.

In the method of another aspect of the present invention, the setting of the communication path by the communication path setting part is performed by linking to each other communication ports of the storage apparatuses between which the communication path is set, including: storing in each of the storage apparatuses the link for the communication path set for each of the storage apparatuses themselves; and providing the management apparatus with a replication management function setting part that provides a user interface for setting a replication management function of data performed between the storage apparatuses, the setting of the replication management function by the replication management function setting part is performed by linking a storage area of the storage apparatus as a replication source to a storage area of the storage apparatus as a replication target, including: providing the management apparatus with a coupling mode setting part that provides a user interface for setting the coupling mode on each of the storage apparatuses; and storing in each of the storage apparatuses the link for the storage areas set for each of the storage apparatuses themselves, and the replication management function setting part permits a linking of the storage area of a replication source to the storage area of a replication target only between the storage apparatuses to which the communication path is set by the communication path setting part.

In order to carry out configuration setting for replication management that would cause the above tripartite deadlock state by a plurality of storage apparatuses requires an assumption that each of storage apparatuses is coupled to a plurality of other storage apparatuses via communication paths. According to the present invention, setting a communication path between storage apparatuses of which setting modes are set enabled is forbidden so to prevent a replication management function from carrying out a setting that would cause the above tripartite state. This can surely prevent a configuration setting that causes a deadlock.

In the method of a further aspect of the present invention, the coupling mode setting part, when receiving an instruction to change the coupling mode of one of the storage apparatuses from permit to deny, does not permit the coupling mode change in a case a plurality of the communication paths are set for one of the storage apparatuses.

If a coupling mode of a storage apparatus having a plurality of already set communication paths is changed to a coupling deny mode, the current communication path cannot be maintained, which brings about an obstacle to the operation of the storage system. With the present invention, such an obstacle can be reliably prevented.

The method of a further aspect of the present invention comprises providing the management apparatus with an encryption information setting part that provides a user interface for setting encryption information on each of the communication ports, the encryption information requested to a user when the communication path setting part sets the communication path; and storing in each of the storage apparatuses the encryption information set on a communication port for each of the storage apparatuses, wherein the coupling mode setting part, when receiving an instruction to change the coupling mode of one of the storage apparatuses from permit to deny, does not permit the coupling mode change in a case a plurality of the communication paths are set for one of the storage apparatuses.

When a plurality of pieces of encryption information are set on a storage apparatus, a plurality of communication paths have been set for the storage apparatus or may possibly be set for the storage apparatus. Changing a coupling mode of such a storage apparatus to a coupling deny mode brings about an obstacle to the operation of the storage system. With the present invention, such an obstacle can be reliably prevented.

In the method of a further aspect of the present invention, the storage apparatus stores therein a permissible number of the communication paths permitted to be set for the storage apparatus themselves, and the communication path setting part does not permit a setting of the communication paths of which the number exceeds the permissible number set for the storage apparatus.

According to the present invention, setting communication paths exceeding a permissible number for a storage apparatus is rejected. This can reliably prevent the setting that is against the specification of the storage apparatus or to the operation principle of the storage system.

In the method of a further aspect of the present invention, the management apparatus transmits an instruction to the storage apparatus to which a relevant management apparatus is coupled to communicatively couple the relevant storage apparatus to another of the storage apparatus, and acquires at least any one of pieces of information of the coupling mode, the link for the communication path, the link between the storage area of the replication source and the storage area of the replication target, the encryption information, and the permissible number from each of the storage apparatus via the relevant storage apparatus.

According to the present invention, information stored on each of storage apparatuses can be acquired via a storage apparatus coupled to a management apparatus. This allows the acquirement of information from each of storage apparatuses without a separate communication environment established between the management apparatus and each storage apparatus.

The problem and solution to the problem that are disclosed in this application will be clearly understood by reading the following description of embodiments of the present invention with reference to the accompanying drawings.

Advantageous Effects

The present invention can reliably prevent a configuration setting that would cause a deadlock when data replication management is carried out using a plurality of storage apparatuses.

BRIEF DESCRIPTION OF DRAWINGS

FIG. 5 is a diagram of an example of a path defining table 500.

FIG. 8 is a diagram of an example of replication pair defining table 800.

FIG. 20 is a diagram of an example of a replication pair setting screen.

EMBODIMENTS OF INVENTION

Figure 1A:
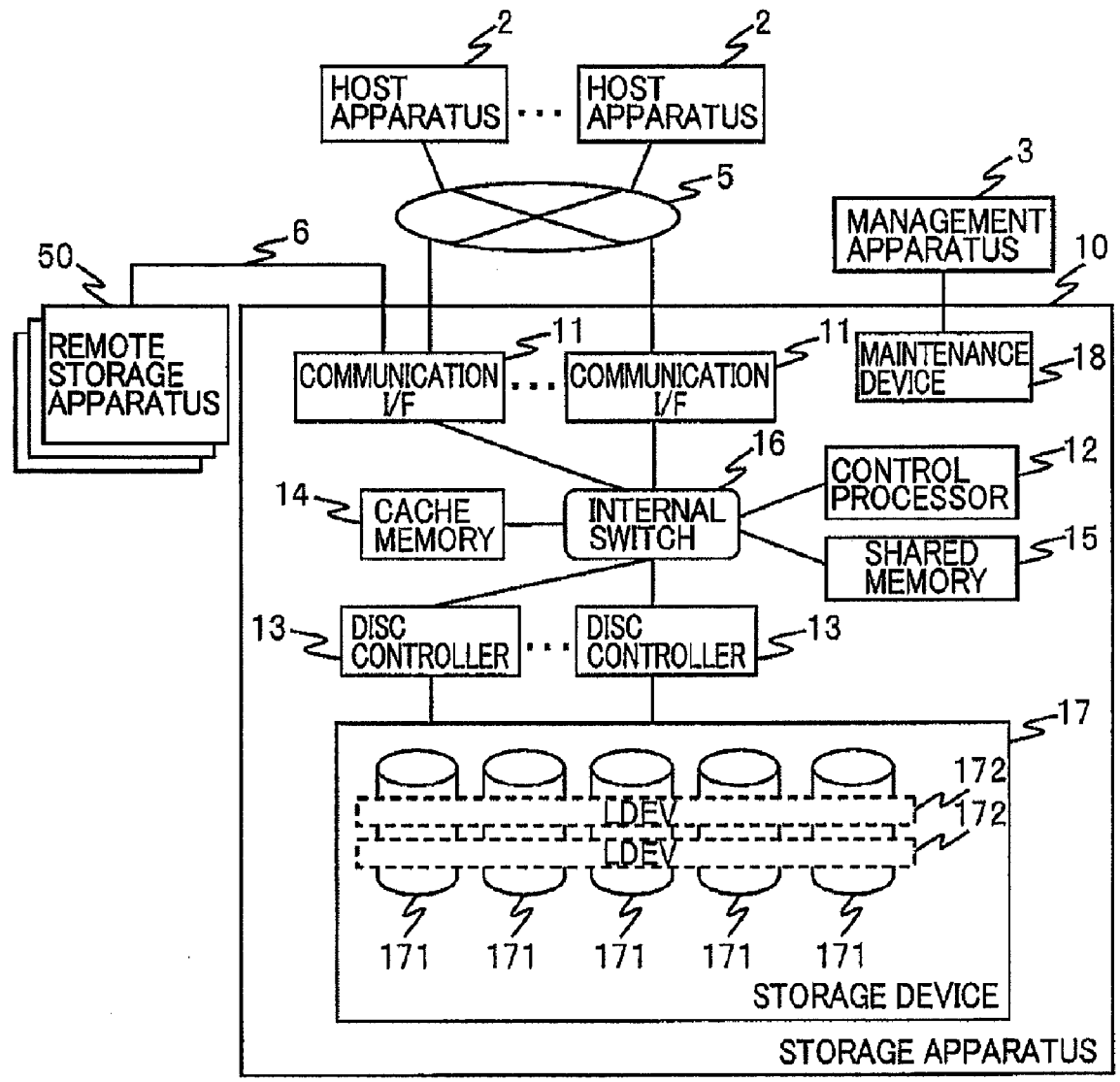
FIG. 1A is a diagram of a configuration of a storage system 1.

An embodiment of the present invention will now be described. FIG. 1A depicts a configuration of a storage system 1 of the embodiment to be described. As shown in FIG. 1A, the storage system 1 includes a host apparatus 2, a storage apparatus 10 that communicates with the host apparatus 2 via a communication network 5, and a management apparatus 3 coupled to the storage apparatus 10 via a LAN (Local Area Network) and the like. As shown in FIG. 1A, one or more remote storage apparatuses 50 having the same configuration as that of the storage apparatus 10 are coupled to the storage apparatus 10 via a communication network 6.

Each of the communication networks 5 and 6 is, for example, a LAN, a SAN (Storage Area Network), the Internet, a public communication line and the like. Communication between the host apparatus 2 and the storage apparatus 10 is carried out in compliance with a protocol such as TCP/IP, iSCSI (internet Small Computer System Interface), Fiber Channel Protocol, FICON (Fiber Connection) (registered trademark), ESCON (Enterprise System Connection) (registered trademark), ACONARK (Advanced Connection Architecture) (registered trademark), and FIBARC (Fiber Connection Architecture) (registered trademark).

The host apparatus 2 is an information processing apparatus (computer) that uses a storage area provided by the storage apparatus 10. For example, the host apparatus 2 is configured of hardware such as a personal computer, a mainframe, and an office computer. The host apparatus 2 transmits an I/O request to the storage apparatus 10 when making access to the storage area.

The storage apparatus 10 includes one or more communication interfaces (hereinafter "communication I/F 11"), one or more control processors (microprocessor) 12, one or more disc controllers 13, a cache memory 14, a shared memory 15, an internal switch 16, a storage device 17, and a maintenance device (service processor) 18. Among these, the communication I/F 11, the control processor 12, the disc controller 13, the cache memory 14, and the shared memory 15 are coupled to one another via the internal switch 16.

The communication I/F 11 receives an I/O request (data write request, data read request and the like) sent from the host apparatus 2, and transmits a response representing the result of a process on the received I/O request (read data, read completion report, write completion report and the like) to the host apparatus 2. The communication I/F 11 has a function relating to protocol control for communication with the host apparatus 2.

The control processor 12 carries out a process relating to data transfer between the communication I/F 11, the disc controller 13, and the cache memory 14 in accordance with the I/O request received by the communication I/F 11. The control processor 12, for example, performs delivery of data (data read from or written to the storage device 17) between the communication I/F 11 and the disc controller 13 via the cache memory 14, and staging (reading data from the storage device 17) and destaging (writing data to the storage device 17) data stored on the cache memory 14.

The cache memory 14 is configured with a RAM (Random Access Memory) and the like, enabling high-speed access. The cache memory 14 has stored thereon, for example, data to be written to the storage device 17 (hereinafter "write data") and data read out from the storage device 17 (hereinafter "read data"). The shared memory 15 has stored thereon various pieces of information used for controlling the storage apparatus 10.

The disc controller 13 communicates with the storage device 17 when reading data from the storage device 17 or writing data to the storage device 17.

The internal switch 16 is configured with, for example, a high-speed cross bar switch. Communication via the internal switch 16 is carried out in compliance with a protocol such as Fiber Channel, iSCSI, TCP/IP.

The storage device 17 is configured of a recording medium, such as a hard disc drive 171 and a semiconductor storage device (SSD (Solid State Drive)). Hereinafter, the storage device 17 will be described as the hard disc drive 171 of an SAS (Serial Attached SCSI) type or a SATA (Serial ATA) type. The hard disc drive 171 is controlled according to a control method for RAID (Redundant Arrays of Inexpensive (or Independent) Disks) (e.g., according to a RAID level of 0, 1, 5, 6, etc.).

The storage device 17 provides storage areas in units of logical devices 172 (LDEVs) configured with storage areas provided by RAIDs (e.g., storage area of a RAID group (parity group)). The unit of storage area provided by the storage device 17 is not limited to the logical device (LDEV).

Figure 2A:
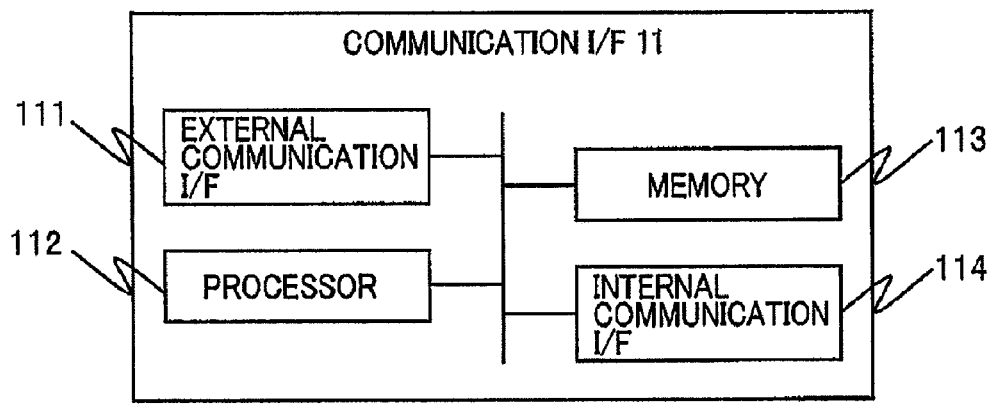
FIG. 2A is a diagram of a hardware configuration of a communication I/F 11.

FIG. 2A depicts a hardware configuration of the communication I/F 11. As shown in FIG. 2A, the communication I/F 11 has an external communication interface (hereinafter "external communication I/F 111"), a processor 112, a memory 113, and an internal communication interface (hereinafter "internal communication I/F 114"). The external communication I/F 111 is, for example, an NIC (Network Interface Card) or an HBA (Host Bus Adaptor). The processor 112 is a CPU (Central Processing Unit), an MPU (Micro Processing Unit) and the like. The memory 113 is a RAM or a ROM (Read Only Memory). The internal communication I/F 114 communicates with the control processor 12, the disc controller 13, the cache memory 14, and the shared memory 15 via the internal switch 16.

Figure 2B:
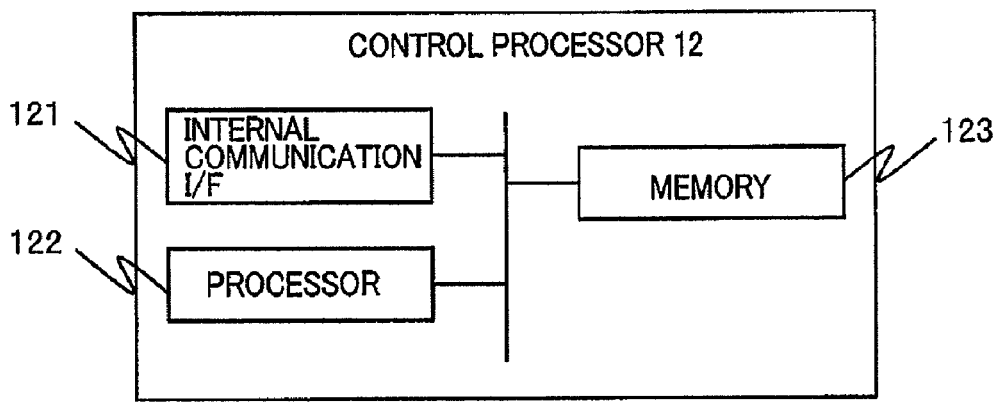
FIG. 2B is a diagram of a hardware configuration of a control processor 12.

FIG. 2B depicts a hardware configuration of the control processor 12. As shown in FIG. 2B, the control processor 12 has an internal communication interface (hereinafter "internal communication I/F 121"), a processor 122, and a memory 123. The internal communication I/F 121 communicates with the communication I/F 11, the disc controller 13, the cache memory 14, and the shared memory 15 via the internal switch 16. The processor 122 is a CPU, an MPU, a DMA (Direct Memory Access) and the like. The memory 123 is a RAM or a ROM.

Figure 2C:
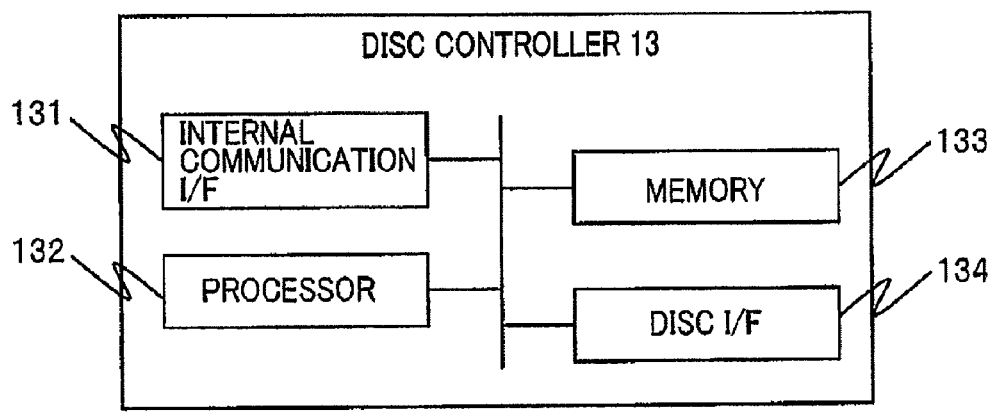
FIG. 2C is a diagram of a hardware configuration of a disc controller 13.

FIG. 2C depicts a hardware configuration of the disc controller 13. As shown in FIG. 2C, the disc controller 13 has an internal communication interface (hereinafter "internal communication I/F 131"), a processor 132, a memory 133, and a disc interface (hereinafter "disc I/F 134"). The internal I/F 131 communicates with the communication I/F 11, the control processor 12, the cache memory 14, the shared memory 15 and the like, via the internal switch 16. The processor 132 is a CPU, an MPU and the like. The memory 133 is a RAM or a ROM. The disc I/F 134 communicates with the storage device 17.

The maintenance device 18 (SVP: Service Processor) is a computer that has a CPU and a memory and t controls components of the storage apparatus 10 and monitors the status of the components. The maintenance device 18 is coupled to components such as the communication I/F 11, the control processor 12, the disc controller 13, the cache memory 14, and the shared memory 15, via the internal switch 16 or other communication means, such as LAN (Local Area Network).

The maintenance device 18 acquires operation information and the like from components of the storage apparatus 10 whenever necessary to provide the management apparatus 3 with acquired information. According to information sent from the management apparatus 3, the maintenance device 18 carries out setting, control, and maintenance (introducing and updating software) and the like of the components.

Figure 1B:
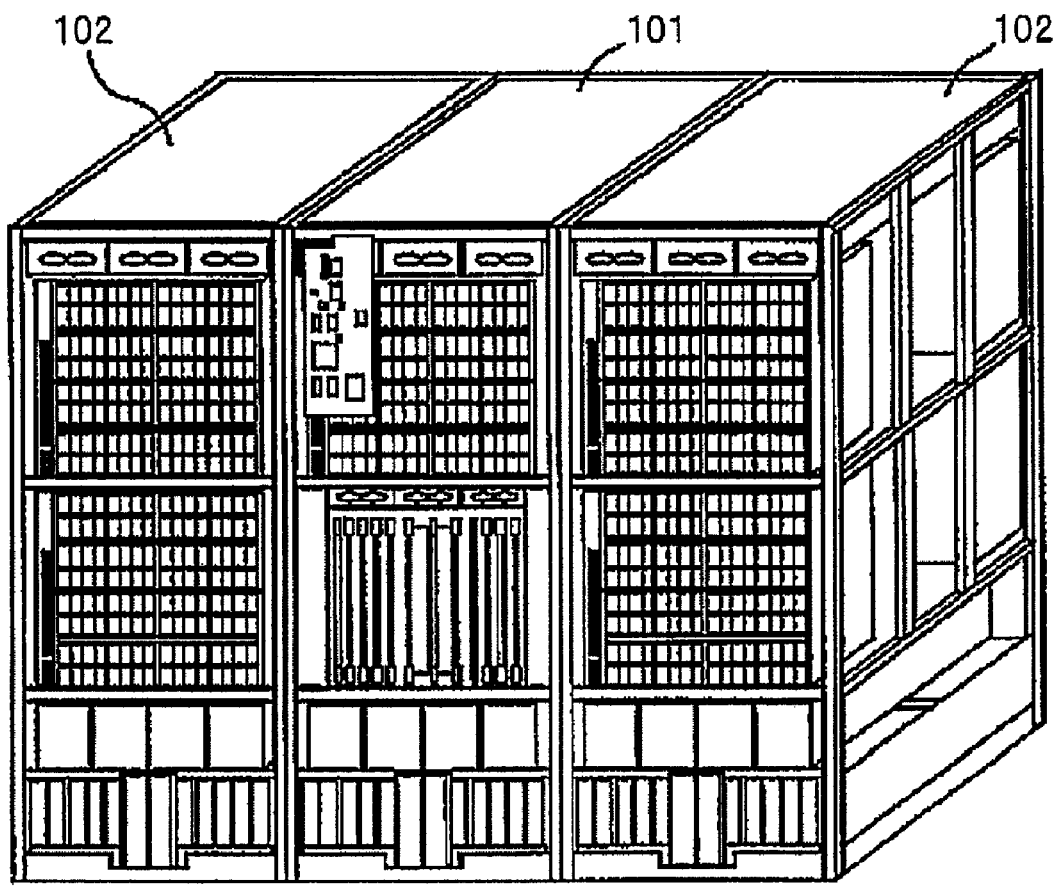
FIG. 1B is (an example of) an external perspective view of a storage apparatus 10.

FIG. 1B depicts (an example of) an external perspective view of the storage apparatus 10. The storage apparatus 10 includes a basic chassis 101 for mounting the communication I/F 11, and an expanded chassis 102 for mounting the expanded hard disc drive 171.

Figure 1C:
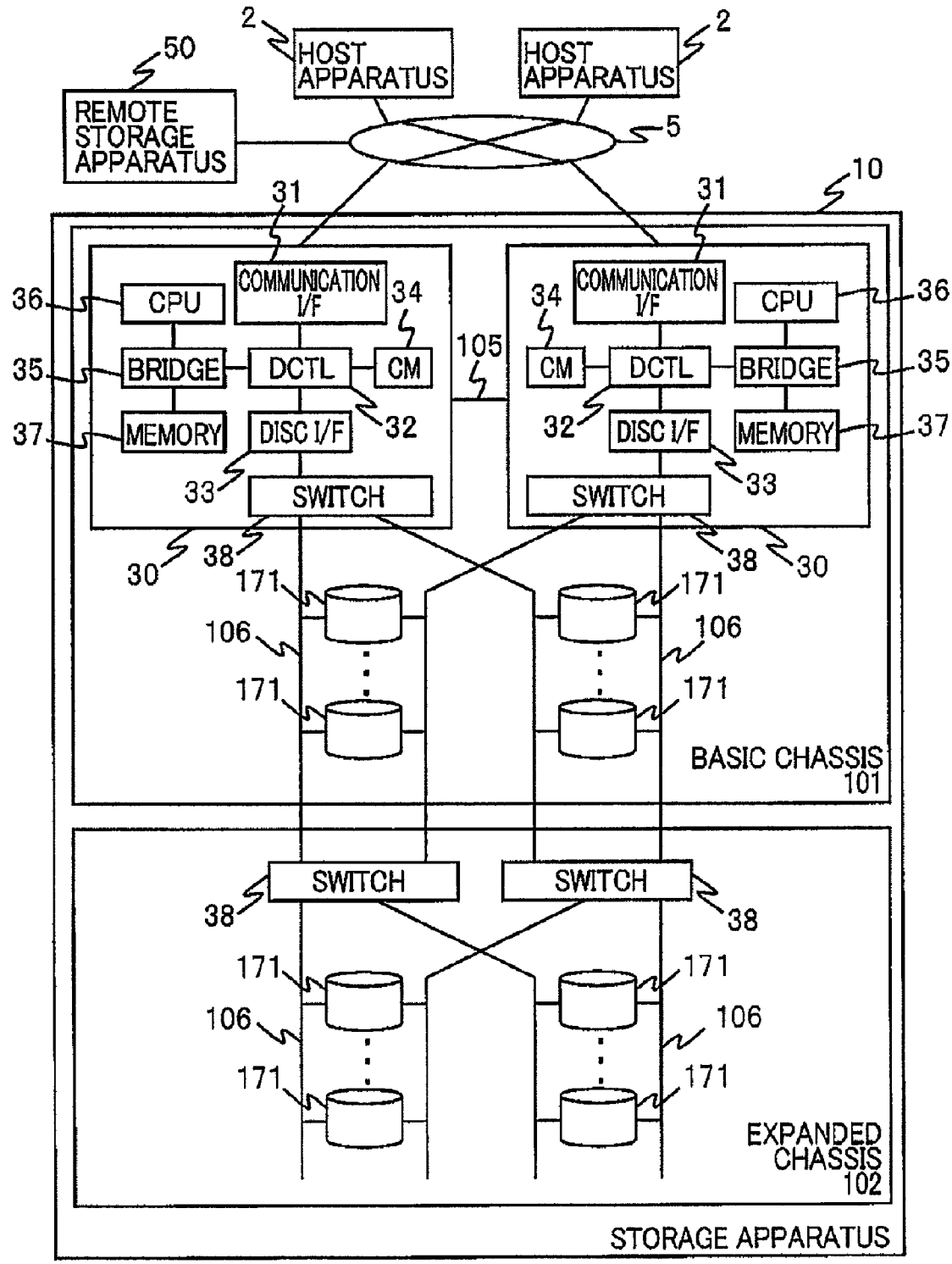
FIG. 1C is a diagram of another configuration of the storage system 1.

The configuration of the storage system 1 is not limited to the above configuration, but can be a configuration shown in FIG. 1C, for example. The storage system 10 of FIG. 1C includes a basic chassis 101 mounted with a plurality of control boards 30, and an expanded chassis 102 mounted with the expanded hard disc drive 171 without a control board 30.

The control board 30 has a communication I/F 31, a data controller (DCTL) 32, a disc I/F 33, a cache memory (CM) 34, a bridge 35, a CPU 36, a memory 37, and a switch 38. The hard disc drives 171 incorporated in the basic chassis 101 and the expanded chassis 102 are coupled to the control board 30 via a fiber channel loop 106. The plurality of control boards 30 are coupled via an internal communication path 105, allowing a construction of a failover mechanism between different control boards 30.

The management apparatus 3 is, for example, a personal computer or an office computer. The management apparatus 3 may be integral with the storage apparatus 10 (may be mounted on the same chassis). The management apparatus 3 is coupled to the maintenance device 18 via a LAN and the like. The management apparatus 3 has a user interface, such as GUI (Graphic User Interface) and CLI (Command Line Interface), for controlling and monitoring the storage apparatus 10.

Figure 3:
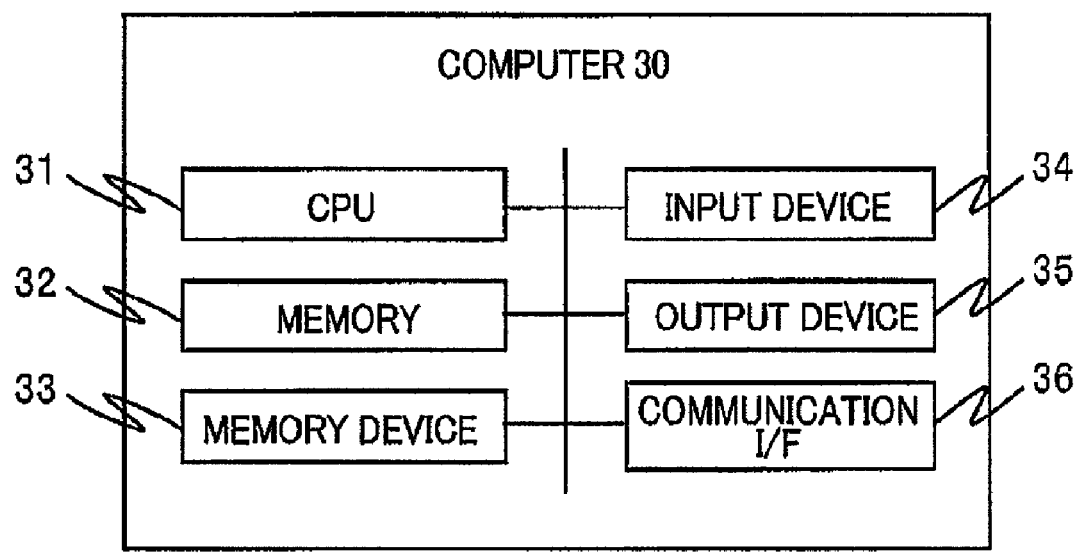
FIG. 3 is a diagram of an example of a computer (information processing apparatus) that can be used as a management apparatus 3.

FIG. 3 depicts an example of a computer (information processing apparatus) that can be used as the management apparatus 3. As shown in FIG. 3, the computer 30 has a CPU 31, a volatile or nonvolatile memory 32 (RAM or ROM), a storage device 33 (e.g., hard disc or semiconductor storage device (SSD)), an input device 34 such as a keyboard and a mouse, an output device 35 such as a liquid crystal monitor and a printer, and a communication interface (hereinafter "communication I/F 36"), such as an NIC and an HBA.

<Logical Volume>

Figure 4:
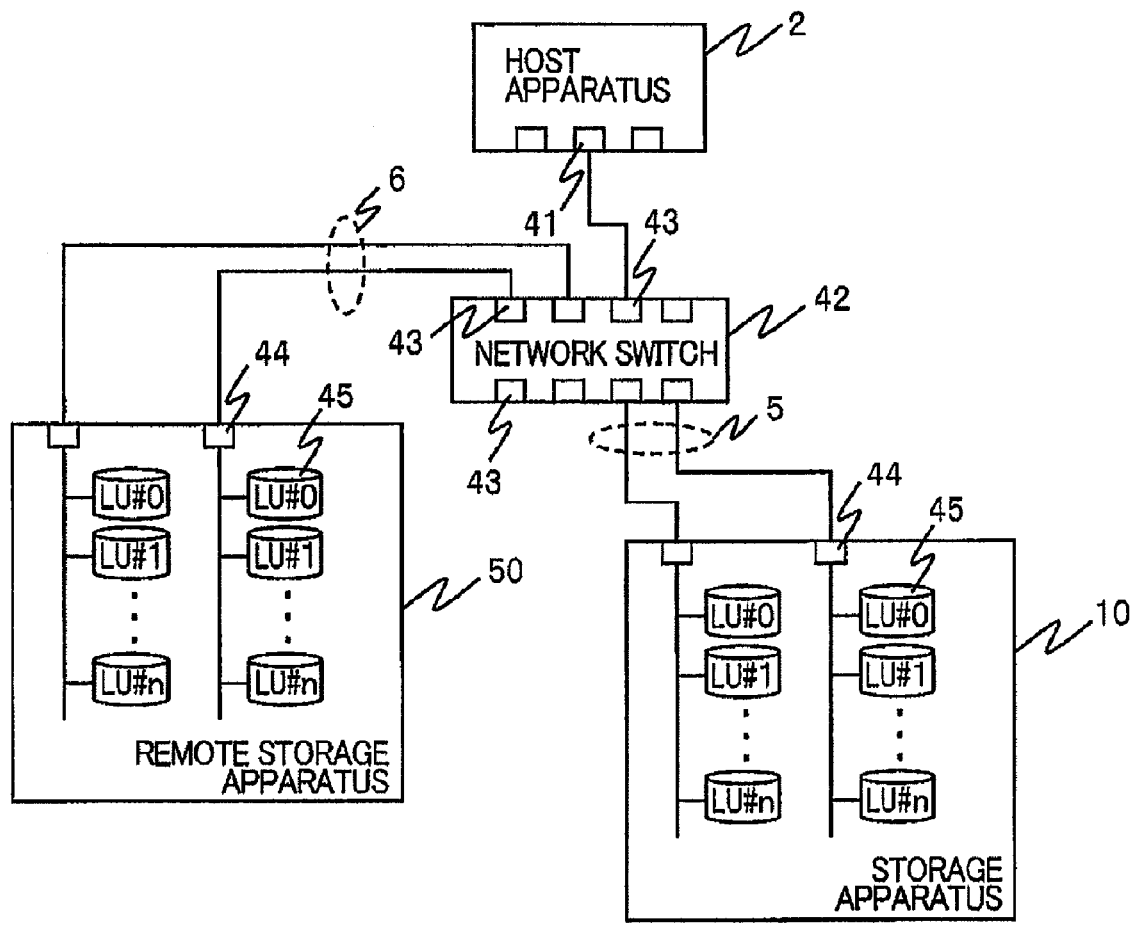
FIG. 4 is an explanatory diagram of the relation between a communication port 41 of a host apparatus 2, a communication port 43 of a network switch 42 configuring the communication networks 5 and 6, communication ports of storage apparatuses 10 and 50, and a logical volume (LU).

The storage apparatus 10 configures a logical volume (hereinafter "logical volume" or "LU (Logical Unit)") based on a storage area (e.g., the above described LDEV) provided by the storage device 17, and provides storage area in units of logical volumes to the host apparatus 2. The host apparatus 2 specifies the identifier of a communication port (hereinafter, also referred to as "port ID") of the storage apparatus 10 and the identifier of a logical volume (hereinafter, also referred to as "LUN") to identify a storage area of the storage apparatus 10. FIG. 4 depicts the relation between a communication port 41 of the host apparatus 2, a communication port 43 of a network switch 42 configuring the communication networks 5 and 6, communication ports 44 of the storage apparatuses 10 and 50, and logical volumes (LU) 45 provided by the storage apparatuses 10 and 50.

<Communication Path (Path)>

When data is transferred between the storage apparatuses 10 and 50, a communication path (hereinafter "path") must be set between the storage apparatuses 10 and 50. Path setting, specifically, is carried out by linking the identifier of a communication port of the storage apparatus 10 to correspond to the identifier of a communication port of the remote storage apparatus 50. The storage apparatuses 10 and 50 store information of a path set in such a manner (hereinafter "path defining information"), for example, on the shared memory 15 or the storage device 17 as a path defining table. Upon transferring data, the storage apparatuses 10 and 50, referring to the path defining information, identify a path leading from a source to a target.

FIG. 5 depicts an example of the path defining table. As shown in FIG. 5, the path defining table 500 is composed of a plurality of records having items of, apparatus ID 511 storing the identifier of the storage apparatus 10, port ID 512 storing the identifier of a communication port of the storage apparatus 10, apparatus ID 513 storing the identifier of the remote storage apparatus 50, and port ID 514 storing the identifier of a communication port of the remote storage apparatus 50. The path defining table 500 of FIG. 5 also contains information on paths between storage apparatuses 10 and 50 and other storage apparatuses 10 and 50. Each of the storage apparatuses 10 and 50 may manage only path information of their own.

<Coupling Mode>

A coupling mode can be set on each of the storage apparatuses 10 and 50. The coupling mode is the information that indicates whether each of the storage apparatuses 10 and 50 permits simultaneous communication with a plurality of other storage apparatuses 10 and 50, that is, whether each of the storage apparatuses 10 and 50 permits simultaneous setting of paths between the storage apparatuses 10 and 50 and a plurality of other storage apparatuses 10 and 50. A user is allowed to set a coupling mode on each of the storage apparatuses 10 and 50 by operating the management apparatus 3. Each of the storage apparatuses 10 and 50 stores a coupling mode currently set on each of the apparatuses themselves, for example, on the shared memory 15 and the storage device 17 as coupling mode information.

Figure 6:
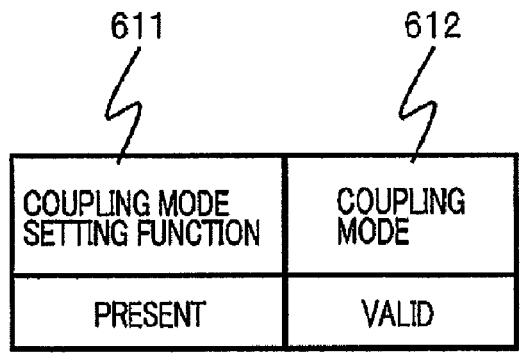
FIG. 6 is a diagram of an example of coupling mode information 600.

FIG. 6 depicts an example of coupling mode information set on each of the storage apparatuses 10 and 50. As shown in FIG. 6, the coupling mode information 600 has items of coupling mode setting function 611 storing information indicative of whether each of the storage apparatuses 10 and 50 has a function relating to coupling mode (indicative of the presence/absence of the function), and coupling mode 612 storing a coupling mode (enabled (permits multicoupling)/disable (denies multicoupling)) currently set on each of the storage apparatuses 10 and 50.

<Encryption Information Setting Function>

Encryption information (password) for using a communication port can be set on each communication port of the storage apparatuses 10 and 50. The encryption information can be set, for example, by operating the management apparatus 3. When a communication port having encryption information set thereon is used at the time of the above path setting, the user is required to input the encryption information. A path cannot be set using the communication port unless the encryption information is authenticated. Encryption information can be set for each path where each path is set with the use of the communication port. The storage apparatuses 10 and 50 store encryption information set on each of their communication ports, for example, on the shared memory 15 and the storage device 17 as encryption information. The above authentication mechanism using encryption information is realized using, for example, a CHAP (Challenge Handshake Authentication Protocol) and the like.

Figure 7:
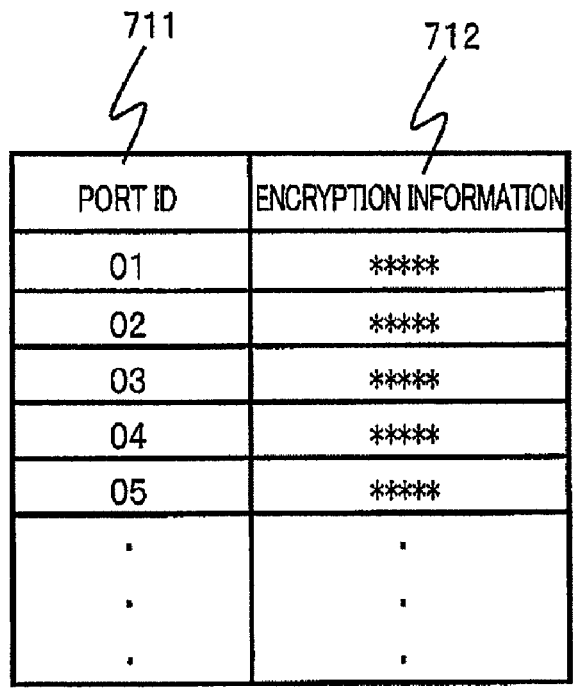
FIG. 7 is a diagram of an example of encryption information 700.

FIG. 7 depicts an example of encryption information stored on the storage apparatuses 10 and 50. As shown in FIG. 7, the encryption information 700 contains encryption information 712 set on each communication port (port ID 711) of the storage apparatuses 10 and 50.

<Replication Management Function>

Each of the storage apparatuses 10 and 50 has a function of automatically storing a replication of data stored in a logical volume 45 into another logical volume 45 (replication management function (replication)). A combination (hereinafter may be referred as "replication pair") of a logical volume as a replication source (hereinafter "replication source LU") and a logical volume as a replication target (hereinafter "replication target LU") must be set when the replication management function is used. The storage apparatuses 10 and 50 store information of a set replication pair (hereinafter "replication pair defining information"), for example, on the shared memory 15 and the storage device 17 as a replication pair defining table 800. Upon carrying out a process of the replication management function, the storage apparatuses 10 and 50 refer to the replication pair defining table 800.

FIG. 8 depicts an example of a replication pair defining table 800. As shown in FIG. 8, the replication pair defining table 800 is composed of a plurality of records each having items of apparatus ID 811 storing the identifier of a storage apparatus 10 including a replication source LU, port ID 812 storing the identifier of a communication port to which the replication source LU couples, LUN 813 storing the identifier of the replication source LU (LUN), apparatus ID 814 storing the identifier of a storage apparatus 10 including a replication target LU, port ID 815 storing the identifier of a communication port to which the replication target LU couples, and LUN 816 storing the identifier of the replication target LU (LUN).

Control states of a replication pair include a synchronizing state (pair state)), a split state (pair suspend)), a data transfer state (copying state), and a halt state (failure state.) The user is allowed to change a control state of the replication pair by operating the management apparatus 3. When the control state of the replication pair is in a synchronizing state among the above control states, data is replicated instantly upon formation of a finite difference between data in a replication source LU and data in a replication target LU to ensure the real-time coincidence of the replication source LU with the replication target LU. When the control state of the replication pair is in a split state, a finite difference between data stored in the replication source LU and data stored in the replication target LU (hereinafter "finite difference information") is managed, but real-time coincidence of the data in the replication source LU with the data in the replication target LU is not ensured.

When the control state changes from the split state to the synchronizing state, based on finite difference information, the storage apparatuses 10 and 50 carry out data transfer to match the contents of the replication source LU to the contents of the replication target LU. If the replication management function develops any fault making it impossible to maintain the synchronizing state or the split state, the control state of the replication pair changes to the halt state. When the control state changes (recovers) from the halt state to the synchronizing state, every data in the replication source LU is transferred to the replication target LU. The control state of the replication pair during transition from the split state or the halt state to the synchronizing state is a data transfer state (copying state).

Figure 9:
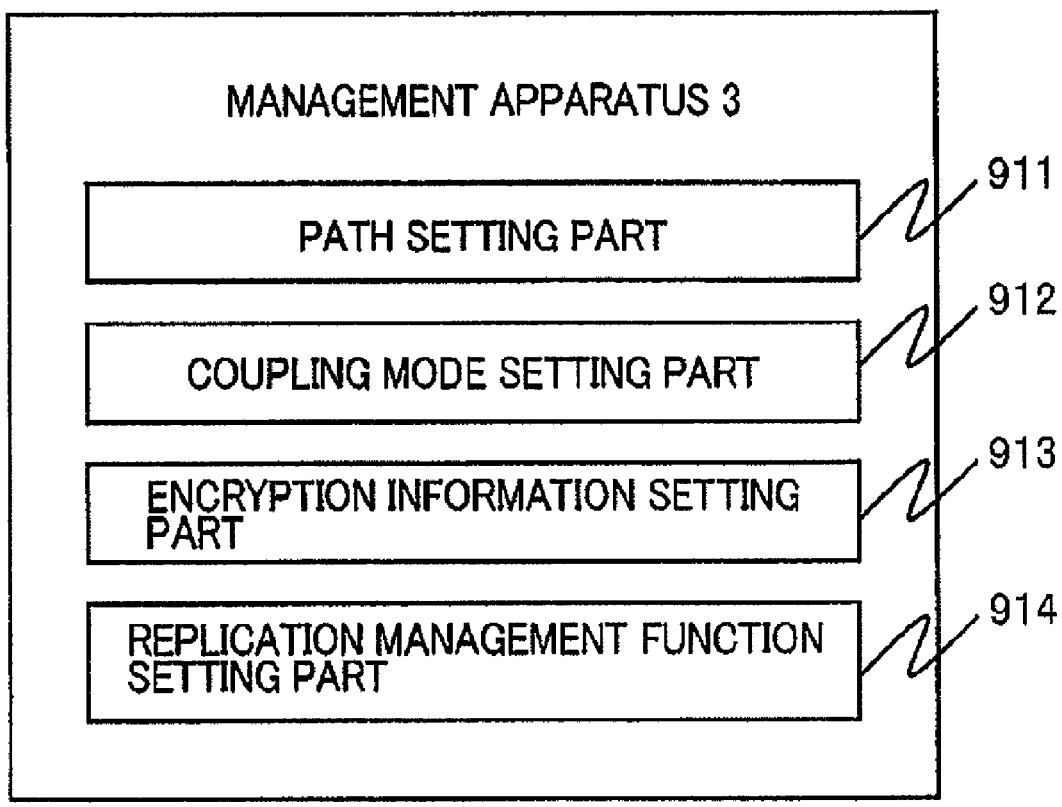
FIG. 9 is a diagram of functions of the management apparatus 3.

FIG. 9 depicts functions of the management apparatus 3. As shown in FIG. 9, the management apparatus 3 has functions of a path setting part 911 that provides a function and a user interface relating to setting and managing a path (communication path setting part), a coupling mode setting part 912 that provides a function and a user interface relating to setting and managing a coupling mode, an encryption information setting part 913 that provides a function and a user interface relating to setting and managing encryption information, and a replication management function setting part 914 that provides a function and a user interface relating to setting and managing the replication management function. The functions shown in FIG. 9 are realized by the CPU 31 executing a program stored on the memory 32.

Figure 10:
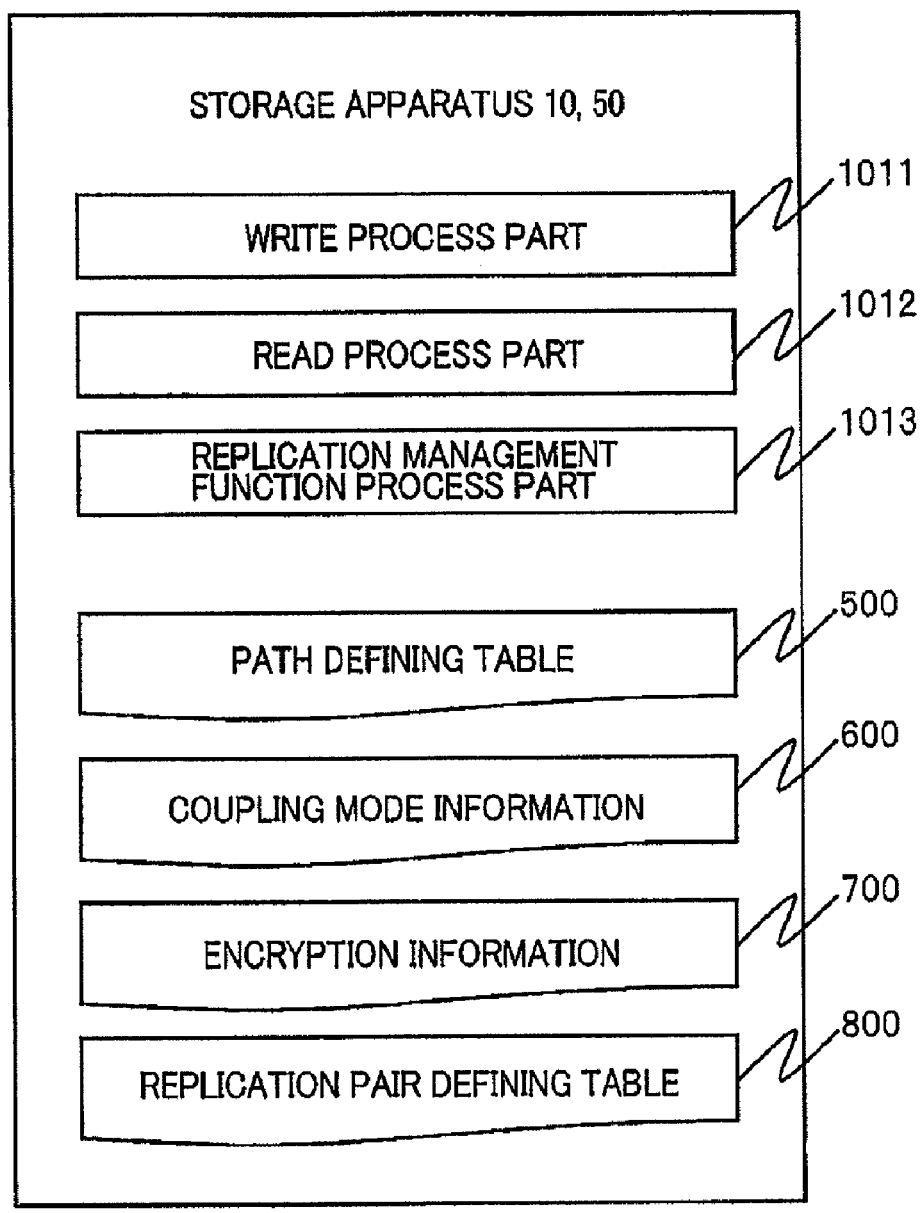
FIG. 10 is a diagram of functions of the storage apparatus 10 and data managed by the storage apparatus 10.

FIG. 10 depicts functions of the storage apparatus 10 and data managed by the storage apparatus 10. As shown in FIG. 10, the storage apparatus 10 has a function of a write process part 1011 that carries out a process relating to writing of data, a read process part 1012 that carries out a process relating to reading of data, and a replication management function process part 1013 that carries out a process relating to the replication management function. The functions shown in FIG. 10 are realized by the processor 112 of the communication I/F 11, the processor 122 of the control processor 12, or the processor 132 of the disc controller 13 executing a program stored on the memory 113, the memory 123, the memory 133, or the storage device 17.

The storage apparatus 10 and 50 store information such as the path defining table 500, the coupling mode information 600, the encryption information setting information 700, and the replication pair defining table 800 on the shared memory 15 and the storage device 17. These pieces of information are updated whenever the management apparatus 3 accesses the maintenance device 18.

=Description of Processes=

<Write Process>

Figure 11:
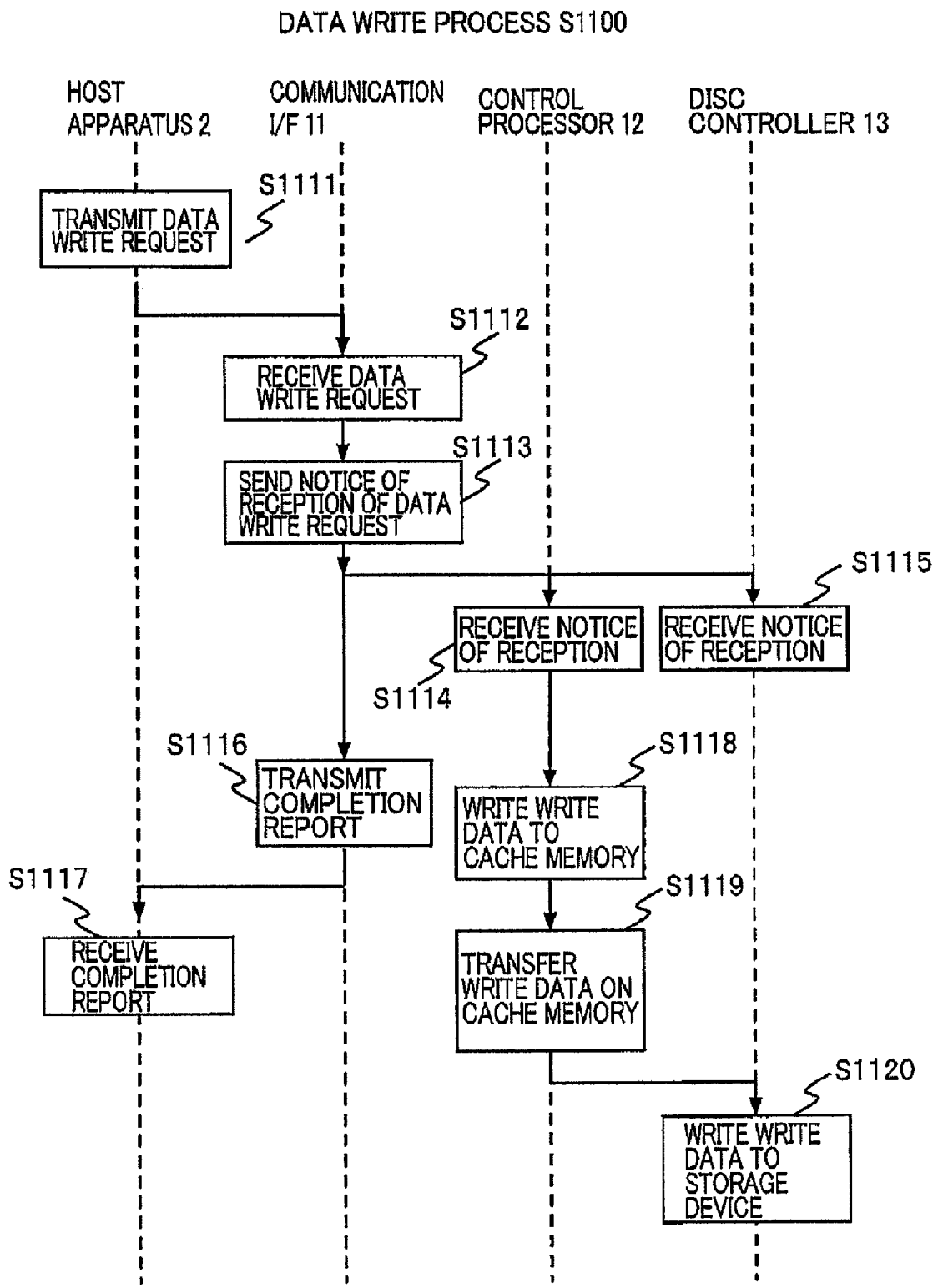
FIG. 11 is a flowchart for explaining a data write process S1100.

FIG. 11 is a flowchart for explaining a process that is carried out by the write process part 1011 of the storage apparatus 10 (hereinafter "data write process S1100") when the storage apparatus 10 receives a data write request as the above I/O request from the host apparatus 2. The data write process S1100 will now be described referring to FIG. 11.

A data write request transmitted from the host apparatus 2 is received by the communication I/F 11 of the storage apparatus 10 (S1111, S1112). Receiving the data write request from the host apparatus 2, the communication I/F 11 sends a notice of reception of the data write request to the control processor 12 and the disc controller 13 (S1113), which receive the notice (S1114, S1115). The communication I/F 11 then transmits a completion report to the host apparatus 2 (S1116), which receives the completion report transmitted thereto (S1117).

Receiving the notice from the communication I/F 11, the control processor 12 writes data to be written in accordance with the data write request (hereinafter "write data"), to the cache memory 14 (S1118). The control processor 12 transfers the data written on the cache memory 14 to the disc controller 13 whenever necessary (S1119). The disc controller 13 then writes the data transferred from the control processor 12, to the storage device 17 (S1120).

The complete report to the host apparatus 2 need not be transmitted in the above timing. The complete report may be transmitted, for example, after completion of processes S1118 and S1119. The write process S1100 is thus carried out in the above manner.

<Read Process>

Figure 12:
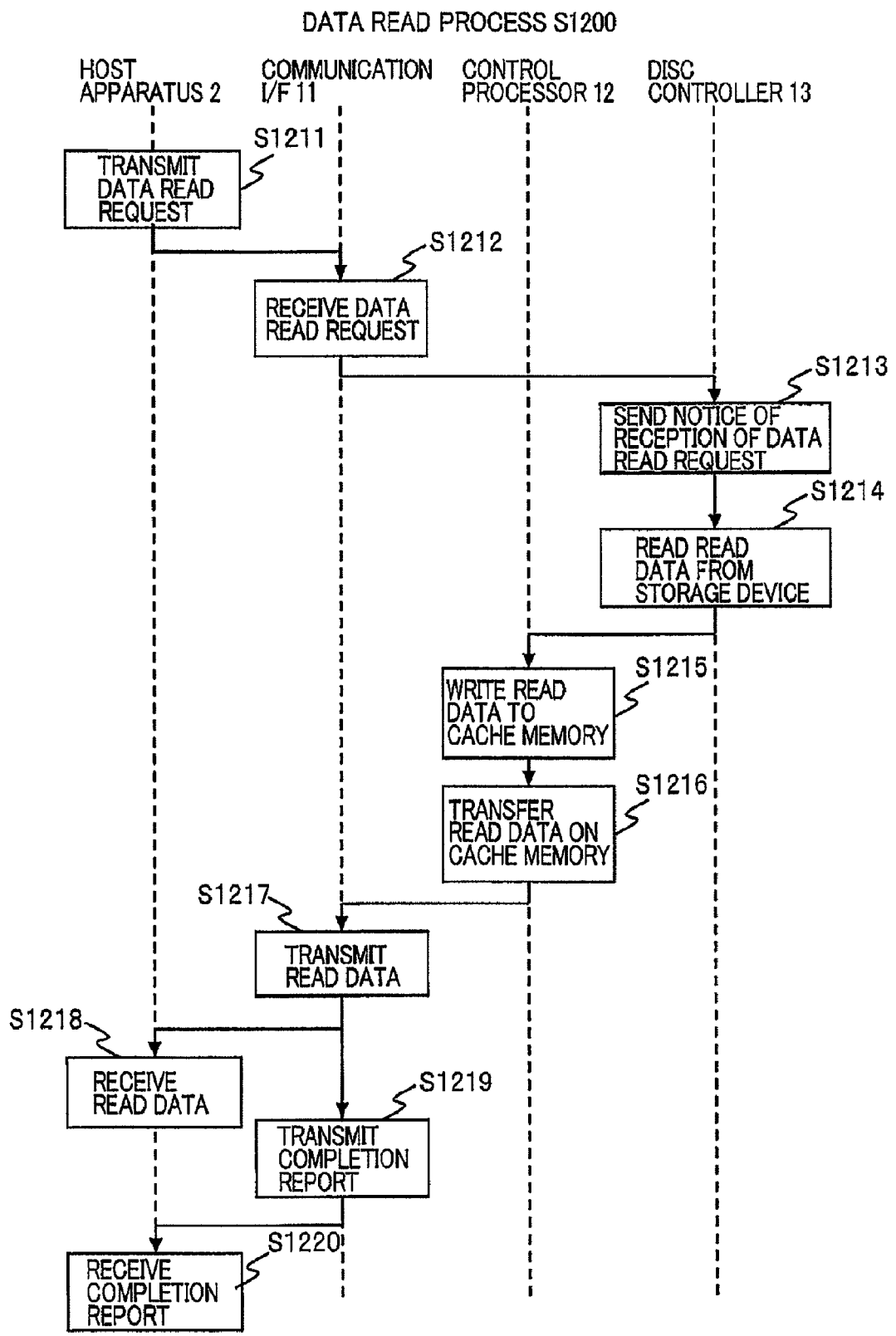
FIG. 12 is a flowchart for explaining a data read process S1200.

FIG. 12 a flowchart for explaining a process that is carried out by the read process part 1012 (hereinafter "data read process S1200") when the storage apparatus 10 receives a data read request as the above I/O request from the host apparatus 2. The data read process S1200 will be described referring to FIG. 12.

A data read request transmitted from the host apparatus 2 is received by the communication I/F 11 of the storage apparatus 10 (S1211, S1212). Receiving the data read request from the host apparatus 2, the communication I/F 11 sends a notice of reception of the data read request to the control processor 12 and the disc controller 13 (S1213).

Receiving the notice from the communication I/F 11, the disc controller 13 reads out data specified by the data read request (e.g., data specified by an LBA (Logical Block Address) from the storage device 17 (S1214). The control processor 12 writes the data read out by the disc controller 13 to the cache memory 14 (S1215), and transfers the data written on the cache memory 14 to the communication I/F whenever necessary (S1216).

The communication I/F 11 sequentially transmits data sent from the control processor 12, to the host apparatus 2 as read data (S1217), and the host apparatus 2 receives the read data (S1218). Upon completing transmission of the read data, the communication I/F 11 transmits a completion report to the host apparatus 2 (S1219), which receives the completion report transmitted thereto (S1220). The read process S1200 is thus carried out in the above manner.

<Path Setting Process>

Figure 13:
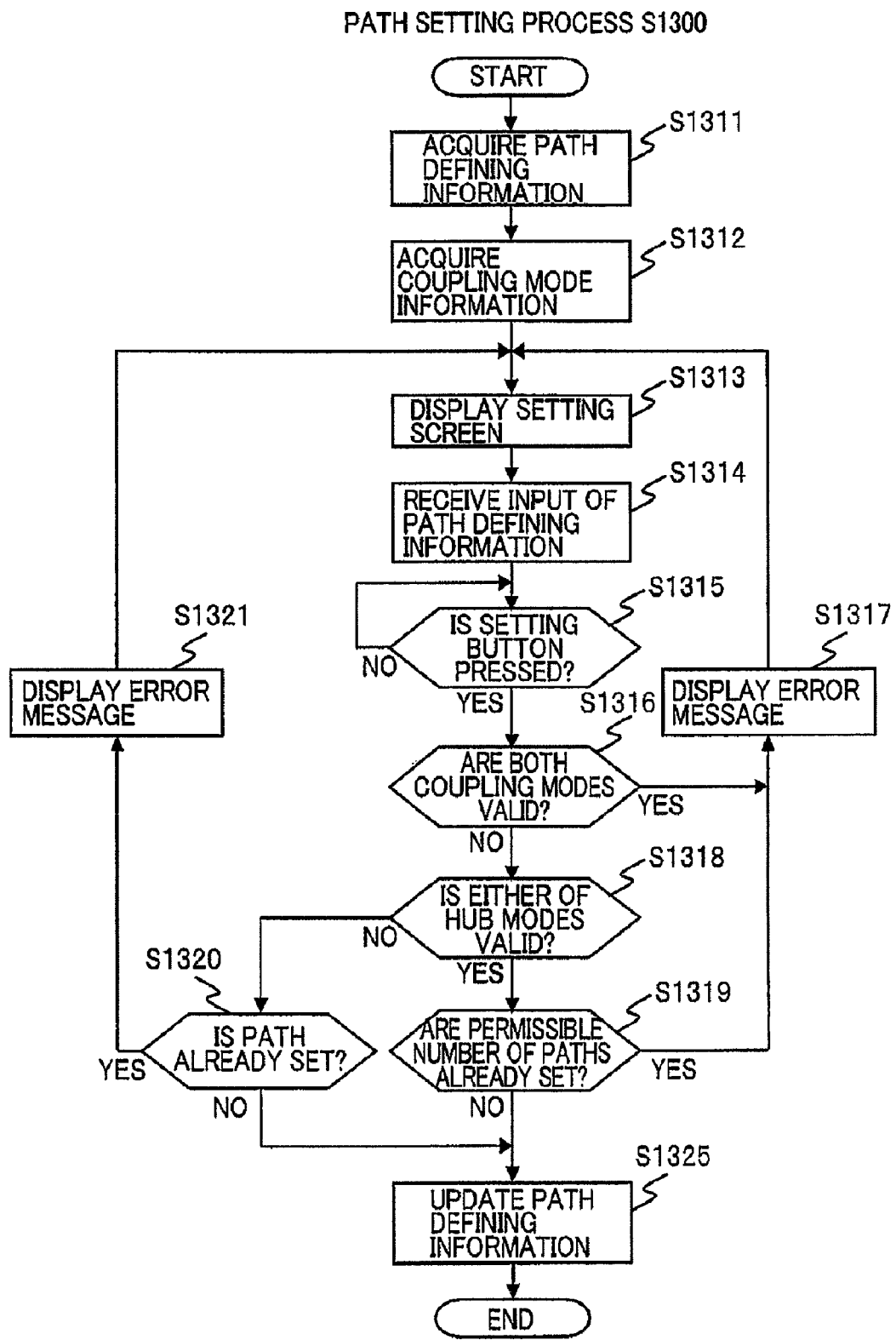
FIG. 13 is a flowchart for explaining a path setting process S1300.

FIG. 13 is a flowchart for explaining a process that is carried out mainly by the path setting part 911 of the management apparatus 3 (hereinafter "path setting process S1300") when a user carries out path setting on the management apparatus 3. The path setting process S1300 will be described referring to FIG. 13.

When a start operation for path setting is carried out, the path setting part 911 acquires path defining information and coupling mode information from the storage apparatuses 10 and 50 (S1311, S1312). Path defining information and coupling mode information from the storage apparatus 50 besides the storage apparatus 10 coupled to the management apparatus 3 is acquired in such a way that, for example, the management apparatus 3 sends an instruction to the storage apparatus 10 coupled to the management apparatus 3 to couple the storage apparatus 10 coupled to the management apparatus 3, to the different storage apparatus 50 (e.g., instructing the storage apparatus 10 to log in to the different storage apparatus 50).

Figure 14:
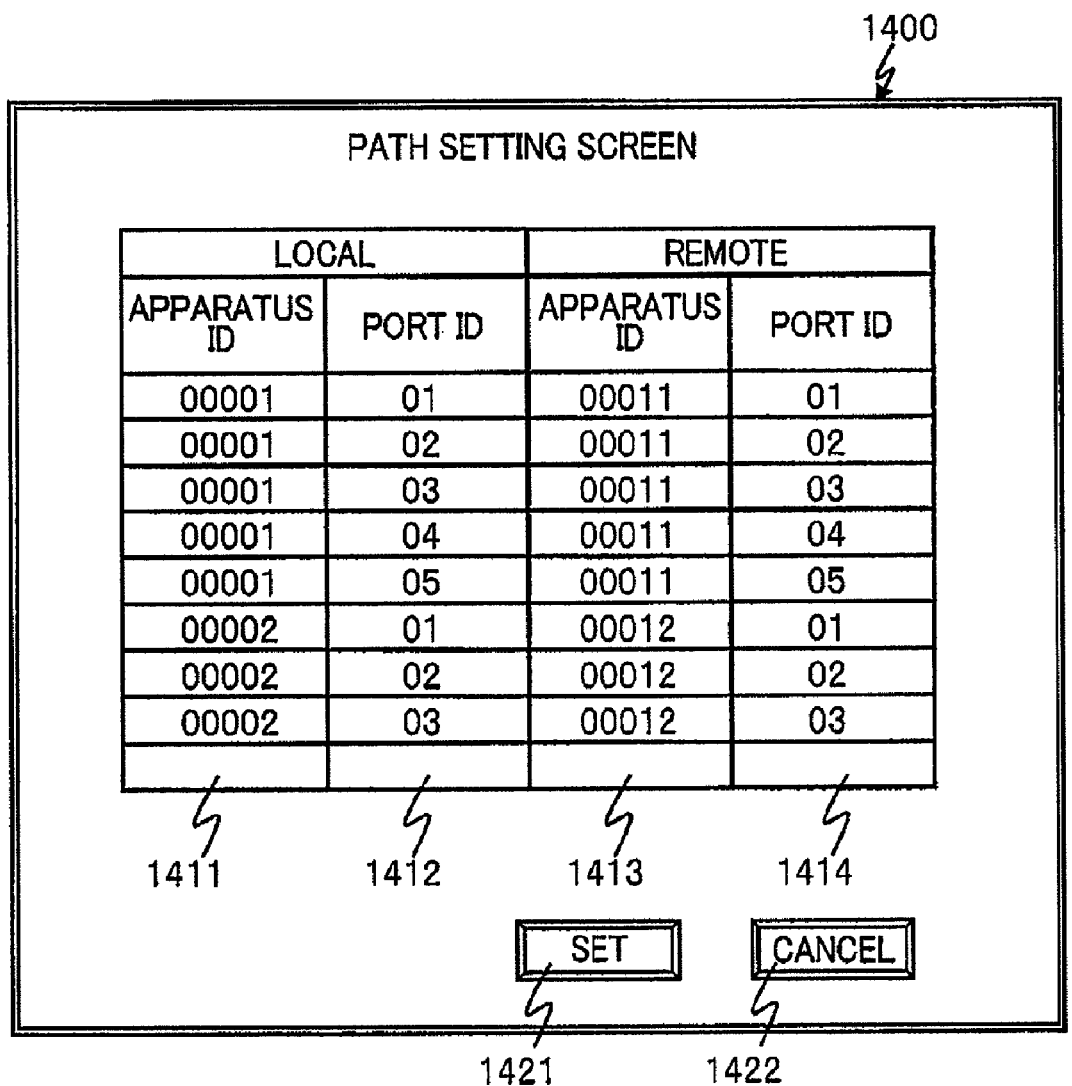
FIG. 14 is a diagram of an example of a path setting screen 1400.

The path setting part 911 then displays a screen for path setting by the user (hereinafter "path setting screen") to prompt the user to input path defining information (S1313, S1314). FIG. 14 depicts an example of a path setting screen. As shown in FIG. 14, the path setting screen 1400 displays a list of currently set paths together with input fields (1411 to 1414) for inputting path defining information to be set anew. To set a new path, the user inputs path defining information to the input fields (1411 to 1414), and operates a setting button 1421 to fix the setting contents.

When the setting button is operated (YES at S1315), the path setting part 911 refers to the contents of the coupling mode 612 in the coupling mode information 600 on each of two storage apparatuses 10 and 50 specified in the input path defining information, and determines whether the coupling modes of both (local and remote) storage apparatuses 10 and 50 are set enabled (S1316).

When both coupling modes are set enabled (YES at S1316), an error message informing the failure of path setting is displayed (S1317), after which the process flow returns to S1313. When either of the two coupling modes is set enabled or both coupling modes are set disabled (NO at S1316), the process flow proceeds to S1318.

In this manner, path setting is not permitted when both coupling modes of the storage apparatuses 10 and 50, whose path is to be set, are set enabled. This is because that permitting path setting as such may lead to path setting that causes the above described tripartite deadlock. That is, this limitation to path setting allows setting of only a single apparatus of the storage apparatuses 10 and 50 allowed to set a path with a plurality of other storage apparatuses 10 and 50 present in a network including a plurality of storage apparatuses 10 and 50 intercoupled via paths. This can reliably prevent a path setting that would cause a state of tripartite deadlock.

At S1318, the path setting part 911 determines whether either of the two coupling modes is set enabled. When either of the two coupling modes is set enabled (YES at S1318), the path setting part 911 determines whether a permissible (maximum) number of paths are already set for either of the apparatuses 10 and 50 whose path is to be set (S1319). When the permissible (maximum) number of paths are already set (YES at S1319), the path setting part 911 displays an error message informing of the failure of path setting (S1317), after which the process flow returns to S1313. When a permissible number of paths are not set yet for both storage apparatuses 10 and 50 whose path is to be set (i.e., the number of already set paths dose not reach the permissible number of paths) (NO at S1319), the process flow proceeds to S1325. The permissible number of paths is the upper limit of the number of paths permitted to the storage apparatuses 10 and 50. The permissible number is determined depending on, for example, a limitation based on the specification of hardware or a limitation based on an operation rule.

At S1318, when both coupling modes are not set enabled (No at S1318), the path setting part 911 determines whether a path is already set for either of the two storage apparatuses 10 and 50 whose path is to be set (S1320). When the path is already set (YES at S1320), the path setting part 911 displays an error message informing of the failure of path setting (S1321), after which the process flow returns to S1313. When the path is not set yet for both storage apparatuses 10 and 50 whose path is to be set (No at S1320), the process flow proceeds to S1325, at which the path setting part 911 accesses the storage apparatuses 10 and 50 to reflect the contents of input path defining information on the path defining table 500 on each of storage apparatuses 10 and 50.

<Coupling Mode Setting Process>

Figure 15:
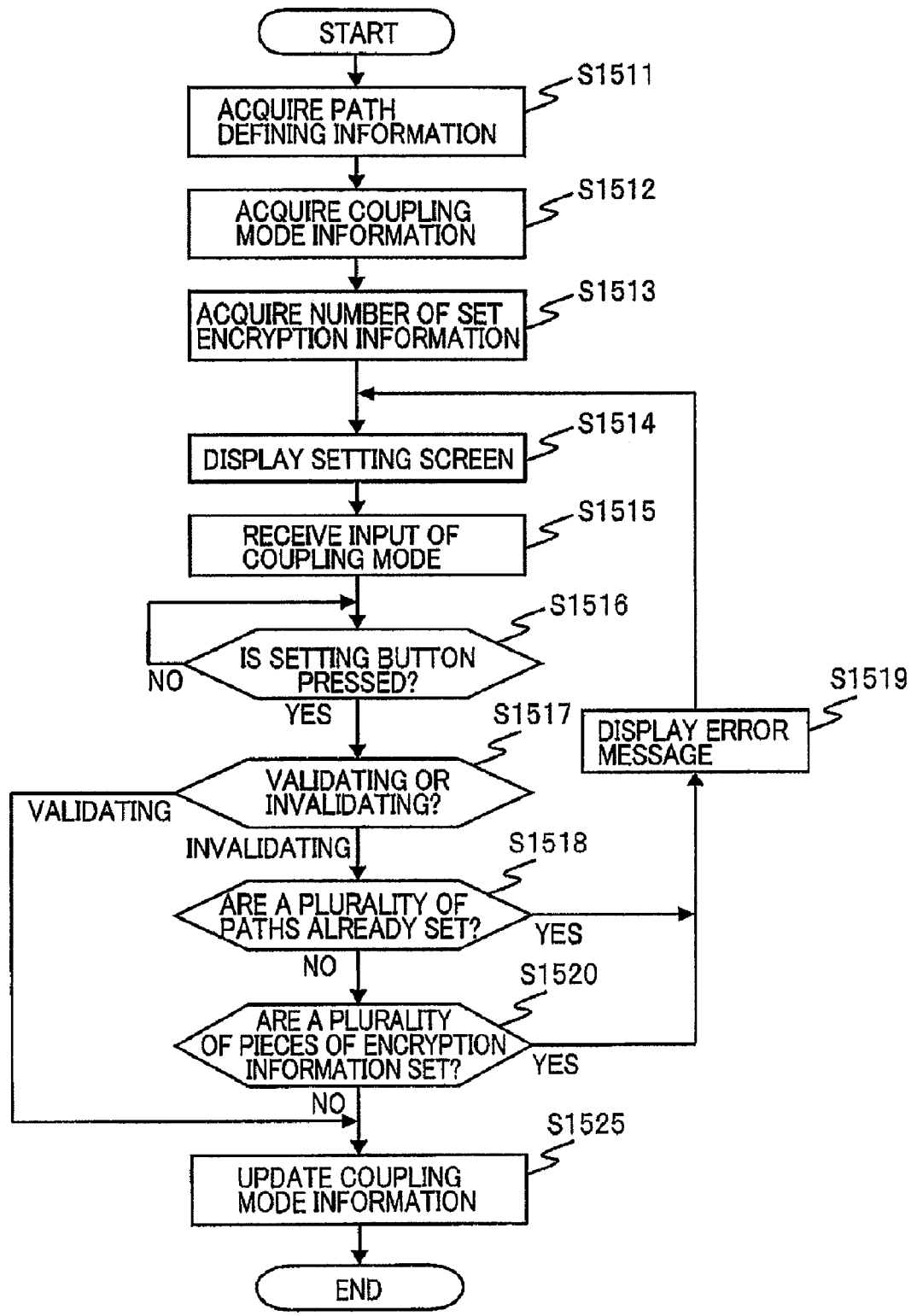
FIG. 15 is a flowchart for explaining a coupling mode setting process S1500.

FIG. 15 is a flowchart for explaining a process that is carried out mainly by the coupling mode setting part 912 of the management apparatus 3 (hereinafter "coupling mode setting process S1500") when a user carries out coupling mode setting on the management apparatus 3. The coupling mode setting process S1500 will be described referring to FIG. 15.

When a start operation for coupling mode setting is carried out, the coupling mode setting part 912 acquires path defining information, coupling mode information, and encryption information from the storage apparatuses 10 and 50 whose coupling mode is to be set (S1511 to S1513). Path defining information, coupling mode information, and encryption information from the storage apparatus 50 besides the storage apparatus 10 coupled to the management apparatus 3 is acquired in such a way that, for example, the management apparatus 3 sends an instruction to the storage apparatus 10 coupled to the management apparatus 3 to couple the storage apparatus 10 coupled to the management apparatus 3, to a different storage apparatus 50 (e.g., instructing the storage apparatus 10 to log in to the different storage apparatus 50).

Figure 16:
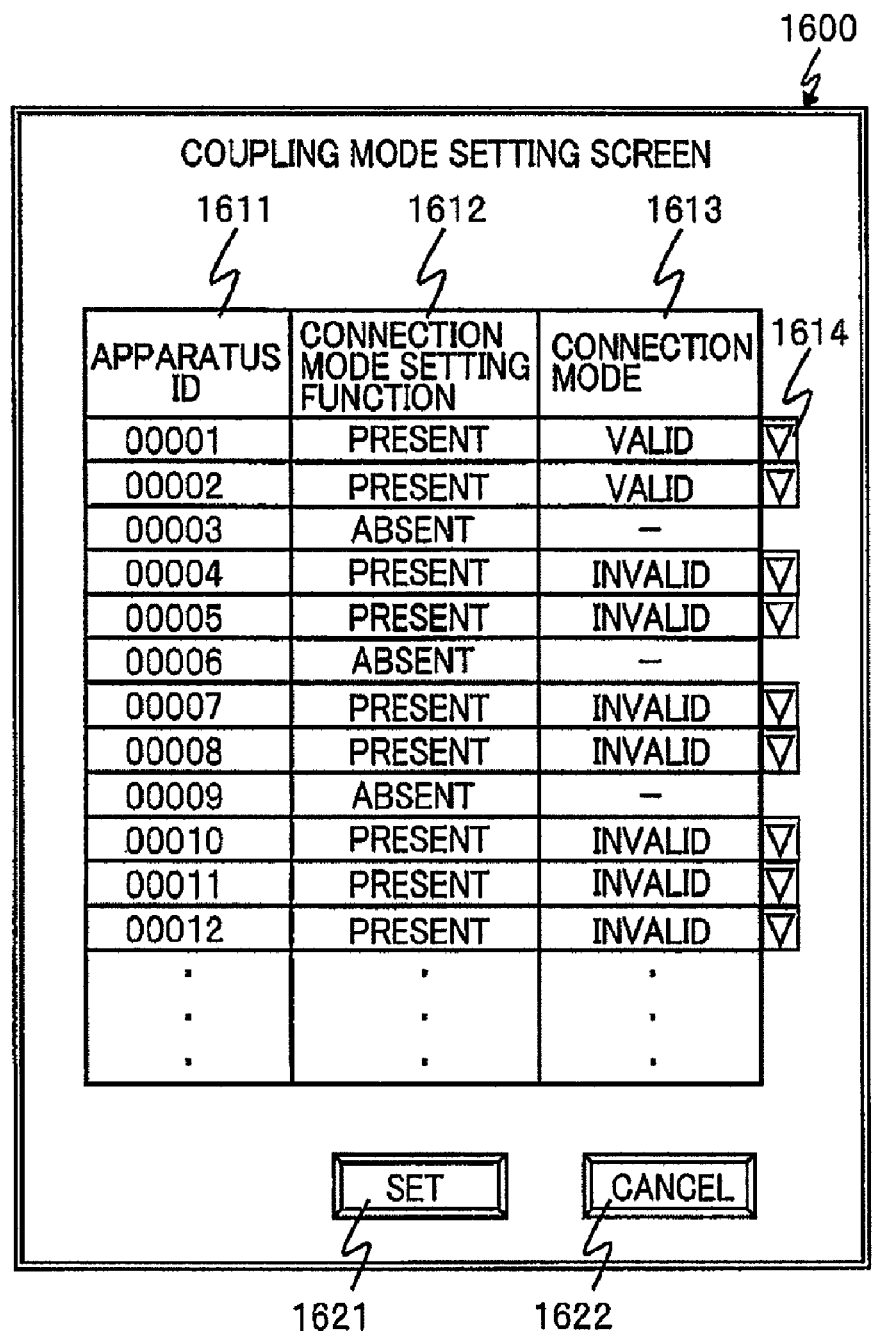
FIG. 16 is a diagram of an example of a coupling mode setting screen 1600.

The coupling mode setting part 912 then displays a screen for coupling mode setting by the user (hereinafter "coupling mode setting screen") to prompt the user to input path defining information (S1514, S1515). FIG. 16 depicts an example of a coupling mode setting screen. As shown in FIG. 16, the coupling mode setting screen 1600 displays currently set coupling modes based on coupling modes acquired from the storage apparatuses 10 and 50. As shown in FIG. 16, the coupling mode setting screen 1600 includes display fields 1611 for the identifiers of the storage apparatuses 10 and 50, display fields 1612 for the coupling mode setting function, and setting fields 1613 for coupling modes. The contents of the coupling mode setting function display fields 1612 cannot be changed on this screen. The contents of the display fields 1612 are set in advance, for example, when the storage apparatuses 10 and 50 are incorporated in the system.

A coupling mode currently set on each of the storage apparatuses 10 and 50 is displayed in each coupling mode setting field 1613, to which a selection button 1614 is provided. When the user operates the selection button 1614, a pull-down menu for selecting "enabled" or "disabled" is displayed. The user selects "enabled" or "disabled" from the pull-down menu to set a coupling mode. As shown in FIG. 16, the selection button 1614 is not displayed for storage apparatuses 10 and 50 having no coupling-mode-related function, and the user cannot set a coupling mode for such an apparatus.

When the setting button 1621 is operated (YES at S1516), the coupling mode setting part 912 determines whether the setting is enabled (from disabled to enabled) or the setting is disabled (from enabled to disabled) (S1517). When the setting is enabled (enabling at S1517), the coupling mode setting part 912 accesses the storage apparatuses 10 and 50 to reflect the set contents on the coupling mode information 600 (S1525).

When the setting is disabled (disabling at S1517), the coupling mode setting part 912 determines whether a plurality of paths are set for the storage apparatuses 10 and 50 (S1518). When a plurality of paths are set (YES at S1518), the coupling mode setting part 912 displays an error message informing of the failure of coupling mode setting (S1519), after which the process flow returns to S1514.

In this manner, disabling a coupling mode is not permitted when a plurality of paths are already set for the storage apparatuses 10 and 50. This is because that if path disabling is permitted, a currently set path cannot be maintained, which brings about an obstacle to the operation of the storage system.

When a plurality of paths are not set for the storage apparatuses 10 and 50 (NO at S1518), the coupling mode setting part 912 determines whether a plurality of pieces of encryption information are set on the storage apparatuses 10 and 50 (whether the total number of encryption information set on each of communication ports of the storage apparatuses 10 and 50 is more than one) (S1520). When a plurality of pieces of encryption information are set (YES at S1520), the coupling mode setting part 912 displays an error message informing of the failure of coupling mode setting (S1519), after which the process flow returns to S1514.

In this manner, disabling a coupling mode is not permitted when a plurality of pieces of encryption information are set on storage apparatuses 10 and 50. This is because that when a plurality of pieces of encryption information are set, a plurality of paths are already established or that a plurality of paths may be set in which permitting a path disabling makes it impossible to maintain or set the plurality of paths.

When a plurality of pieces of encryption information are not set (NO at S1520), the coupling mode setting part 912 accesses the storage apparatuses 10 and 50 to reflect the set contents on the coupling mode information 600 (S1525).
<Encryption Information Setting Process>

Figure 17:
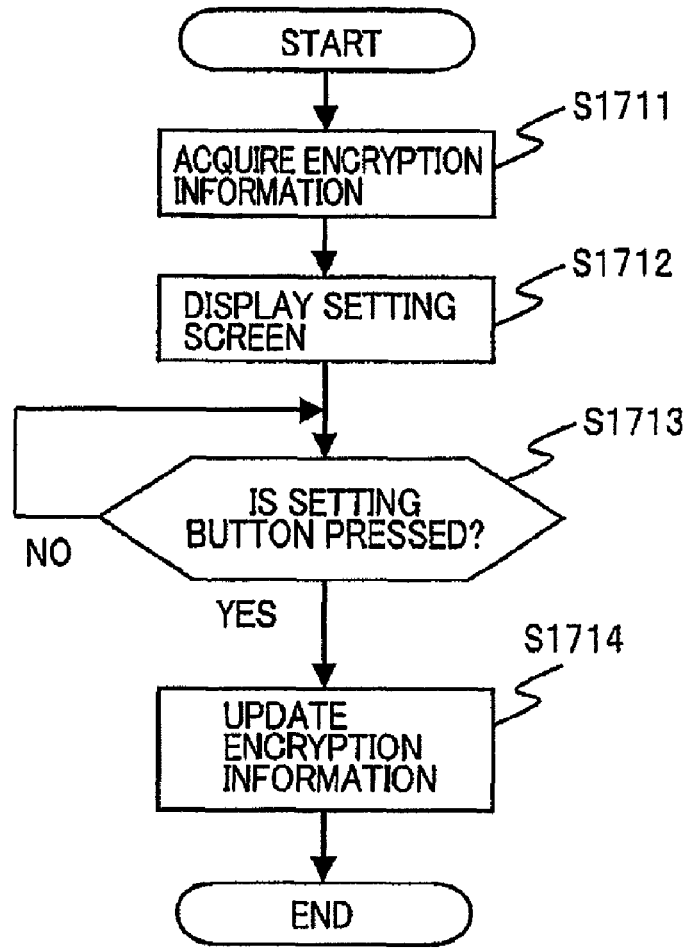
FIG. 17 is a flowchart for explaining an encryption information setting process S1700.

FIG. 17 is a flowchart for explaining a process that is carried out mainly by the encryption information setting part 913 of the management apparatus 3 (hereinafter "encryption information setting process S1700") when a user carries out encryption information setting. The encryption information setting process S1700 will be described referring to FIG. 17.

When a start operation for encryption information setting is carried out, the encryption information setting part 913 acquires encryption information from the storage apparatuses 10 and 50 on which encryption information is to be set (S1711). Encryption information from the storage apparatus 50 different from the storage apparatus 10 coupled to the management apparatus 3 is acquired in such a way that, for example, the management apparatus 3 sends an instruction to the storage apparatus 10 coupled to the management apparatus 3 to couple the storage apparatus 10 coupled to the management apparatus 3, to the different storage apparatus 50 (e.g., instructing the storage apparatus 10 to log in to the different storage apparatus 50).

The encryption information setting part 913 then displays a screen for encryption information setting by the user (hereinafter "encryption information setting screen") to prompt the user to input encryption information (S1712).

Figure 18:
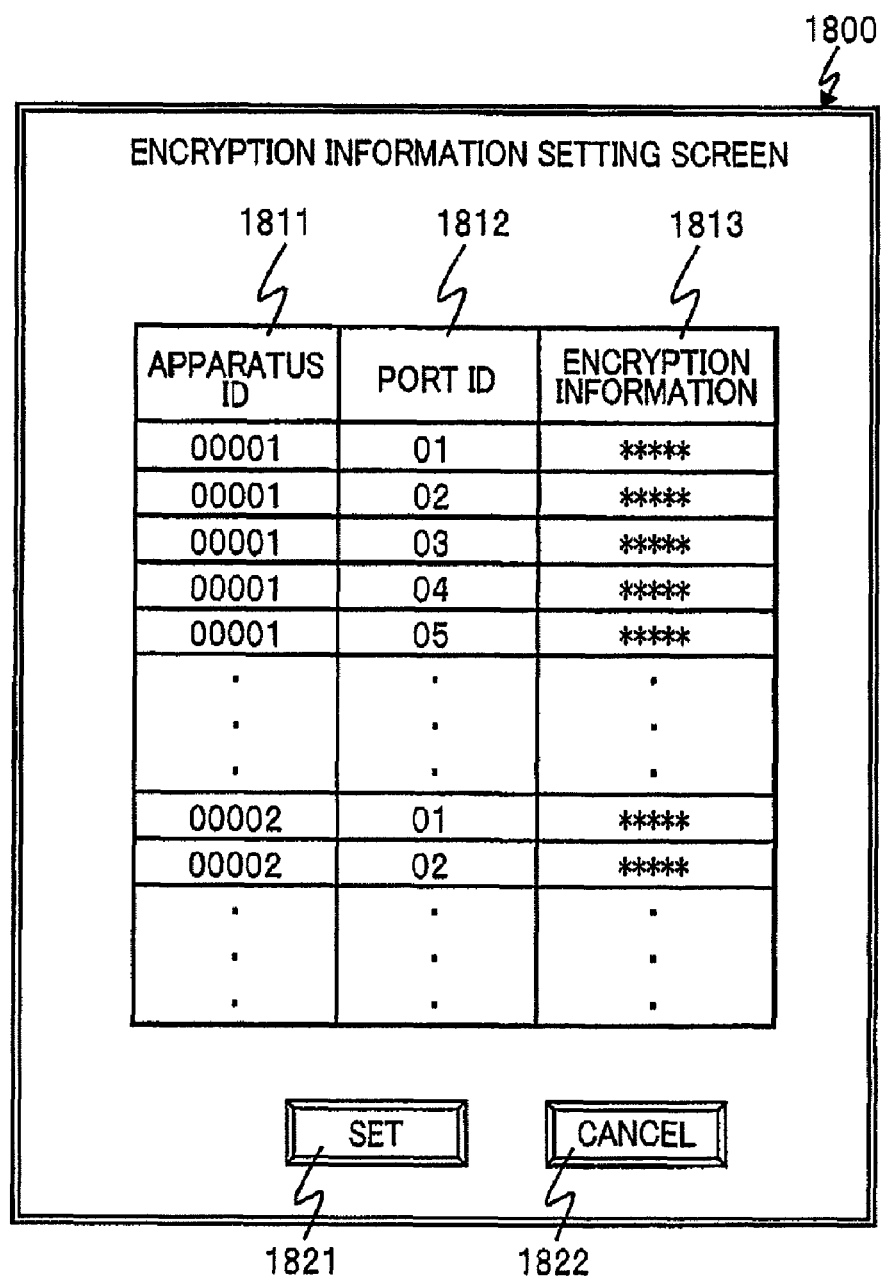
FIG. 18 is a diagram of an example of an encryption information setting screen 1800.

FIG. 18 depicts an example of an encryption information setting screen. As shown in FIG. 18, the encryption information setting screen 1800 displays a list of encryption information currently set on each of communication ports. When encryption information is set on a communication port, the encryption information is input to an input field 1813 for the encryption information, and a setting button 1821 is operated to fix the set contents.

When the setting button 1821 is operated (YES at S1713), the encryption information setting part 913 accesses the storage apparatuses 10 and 50 to reflect set contents on the encryption information 700 (S1714).
<Replication Pair Setting Process>

Figure 19:
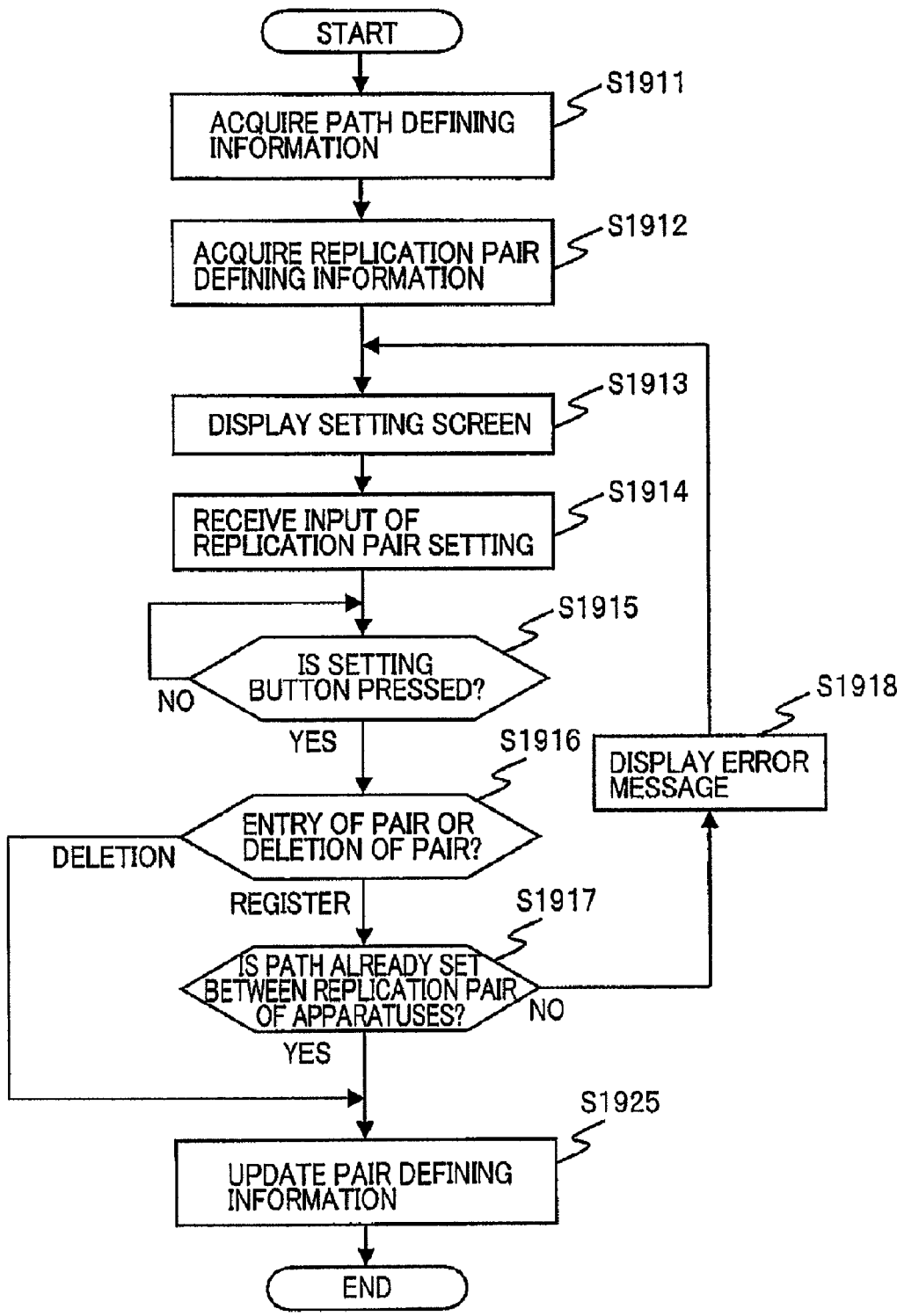
FIG. 19 is a flowchart for explaining a replication pair setting process S1900.

FIG. 19 is a flowchart for explaining a process that is carried out mainly by the replication management function setting part 914 of the management apparatus 3 (hereinafter "replication pair setting process S1900") when a user carries out replication pair setting by the replication management function. The replication pair setting process S1900 will be described referring to FIG. 19.

When a start operation for replication pair setting is carried out, the replication management function setting part 914 acquires path defining information and replication pair defining information from storage apparatuses 10 and 50 (S1911, S1912). Path defining information and replication pair defining information from the storage apparatus 50 different from the storage apparatus 10 coupled to the management apparatus 3 is acquired in such a way that, for example, the management apparatus 3 sends an instruction to the storage apparatus 10 coupled to the management apparatus 3 to couple the storage apparatus 10 coupled to the management apparatus 3, to the different storage apparatus 50 (e.g., instructing the storage apparatus 10 to log in to the different storage apparatus 50).

The replication management function setting part 914 then displays a screen for replication pair setting by the user (hereinafter "replication pair setting screen") to prompt the user to input replication pair defining information (S1913, S1914). FIG. 20 depicts an example of a replication pair setting screen.

As shown in FIG. 20, the replication pair setting screen 2000 displays currently set replication pair defining information based on replication pair defining information acquired from the storage apparatuses 10 and 50. As shown in FIG. 16, the replication pair setting screen 2000 includes setting field 2011 for the identifiers of storage apparatuses 10 and 50 as a replication source, setting field 2012 for the identifiers of communication ports of the replication source, setting field 2013 for the identifiers of logical volumes of the replication source (LUN), setting field 2014 for the identifiers of storage apparatuses 10 and 50 as a replication target, setting field 2015 for the identifiers of communication ports of the replication target, setting field 2016 for the identifiers of logical volumes of the replication target (LUN), and deletion instruction field 2017. When setting a replication pair anew, the user inputs replication pair defining information to the input fields (2011 to 2017). When deleting an existing replication pair, the user checks the deletion instruction field 2017. Operating the setting button 2021 fixes set contents.

When the setting button 2021 is operated (YES at S1915), the replication management function setting part 914 determines whether input contents concerns a new entry of a replication pair or a deletion of a replication pair (S1916). When the input contents concern a deletion (deletion at S1916), the replication management function setting part 914 accesses the storage apparatuses 10 and 50 to delete defining information of the replication pair from the replication pair defining table 800 (S1925).

When the input contents concern a new entry (entry at S1916), the replication management function setting part 914 determines whether a path to couple a replication pair is already set by the path setting part 911 (S1917). When the path is not set (No at S1917), the replication management function setting part 914 displays an error message informing of the failure to sett a replication pair (S1918), after which the process flow returns to S1913. When the path is set (YES at S1917), the replication management function setting part 914 accesses the storage apparatuses 10 and 50 to register defining information of an input replication pair.

While an embodiment of the present invention has been described, the above embodiment is described for facilitating the understanding of the present invention and is not intended to limit the interpretation of the present invention. The present invention may be modified or revised without deviating from the gist of the invention, and includes any equivalents thereof.

The invention claimed is:

1. A method of providing an interface for setting communication paths between storage apparatuses in a storage system having a plurality of storage apparatuses, the method comprising:
   communicatively coupling a management apparatus that comprises a communication path setting part and a coupling mode setting part to each of the storage apparatuses;
   providing a first user interface via the communication path setting part for setting communication paths between the storage apparatuses;
   providing a second user interface via the coupling mode setting part for setting respective coupling mode information stored in each of the storage apparatuses that is indicative of whether the storage apparatus is in a first mode or a second mode where, in the first mode, the storage apparatus is permitted setting of a communication path between the storage apparatus and each of a plurality of others of the storage apparatuses and, in the second mode, the storage apparatus is permitted setting of a communication path only between the storage apparatus and one of the other storage apparatuses; and
   displaying an error message indicating a path setting failure via the first user interface upon receiving a user input via the first user interface for setting of a communication path between any two of the plurality of storage apparatuses for which, at a time of setting the communication path, the respective coupling mode information stored in each of the two storage apparatuses indicates that the storage apparatus is in the first mode.

2. The method of providing an interface for setting communication paths in a storage system of claim 1, wherein the management apparatus acquires respective path defining information and the respective coupling mode information for each of the storage apparatuses from the storage apparatuses, and wherein the respective path defining information for each of the storage apparatuses indicates each currently set communication path for the storage apparatus.

3. The method of providing an interface for setting communication paths in a storage system of claim 2, further comprising:
   displaying a list of each currently set communication path for each of the storage apparatuses and providing input fields for receiving user input for modifying the respective path defining information for each of the storage apparatuses via the first user interface for setting communication paths between the storage apparatuses; and
   displaying the respective coupling mode information stored in each of the storage apparatuses and providing input fields for receiving user input for modifying the respective coupling mode information for each of the storage apparatuses via the second user interface for setting communication paths between the storage apparatuses.

4. The method of providing an interface for setting communication paths in a storage system of claim 3, further comprising:
   permitting changing the respective current coupling mode information of any of the storage apparatuses that indicates the second mode to indicate the first mode via the second user interface;
   permitting changing the respective current coupling mode information of any of the storage apparatuses that indicates the first mode to indicate the second mode via the second user interface when there are not a plurality of currently set communication paths for the storage apparatus; and
   displaying an error message indicating a coupling mode setting failure upon receiving user input for changing the respective current coupling mode information of any of the storage apparatuses that indicates the first mode to indicate the second mode via the second user interface when there are a plurality of currently set communication paths for the storage apparatus.

5. The method of providing an interface for setting communication paths in a storage system of claim 3, wherein the management apparatus acquires a respective permissible number of communication paths that may be set for each of the storage apparatuses from the storage apparatuses, and further comprising:
   permitting setting of a communication path between any two of the plurality of storage apparatuses for which, at the time of setting the communication path, the respective coupling mode information stored in one of the two storage apparatuses indicates that the storage apparatus is in the first mode and the respective coupling mode information stored in the other of the two storage apparatuses indicates that the storage apparatus is in the second mode via the first interface when the respective permissible numbers of communication paths that may be set for the two storage apparatuses are not set for the two storage apparatuses;

permitting setting of a communication path between any two of the plurality of storage apparatuses for which, at the time of setting the communication path, the respective coupling mode information stored in each of the two storage apparatuses indicates that the storage apparatus is in the second mode via the first interface when no communication path is currently set for either of the two storage apparatuses;

displaying an error message indicating a path setting failure via the first user interface upon receiving a user input via the first user interface for setting of a communication path between any two of the plurality of storage apparatuses for which, at the time of setting the communication path, the respective coupling mode information stored in one of the two storage apparatuses indicates that the storage apparatus is in the first mode and the respective coupling mode information stored in the other of the two storage apparatuses indicates that the storage apparatus is in the second mode when the respective permissible numbers of communication paths that may be set for either of the two storage apparatuses is set for the storage apparatus; and displaying an error message indicating a path setting failure via the first user interface upon receiving a user input via the first user interface for setting of a communication path between any two of the plurality of storage apparatuses for which, at the time of setting the communication path, the respective coupling mode information stored in each of the two storage apparatuses indicates that the storage apparatus is in the second mode via the first interface when a communication path is currently set for either of the two storage apparatuses.

6. A storage system, comprising:

a plurality of storage apparatuses; and a management apparatus communicatively coupled to each of the storage apparatuses, the management apparatus including a processor, a memory, a communication path setting part, and a coupling mode setting part, the communication path setting part providing a first user interface for setting communication paths between the storage apparatuses, the coupling mode setting part providing a second user interface for setting respective coupling mode information stored in each of the storage apparatuses that is indicative of whether the storage apparatus is in a first mode or a second mode where, in the first mode, the storage apparatus is permitted setting of a communication path between the storage apparatus and each of a plurality of others of the storage apparatuses and, in the second mode, the storage apparatus is permitted setting of a communication path only between the storage apparatus and one of the other storage apparatuses, and wherein the first user interface displays an error message indicating a path setting failure upon receiving a user input for setting of a communication path between any two of the plurality of storage apparatuses for which, at a time of setting the communication path, the respective coupling mode information stored in each of the two storage apparatuses indicates that the storage apparatus is in the first mode.

7. The storage system of claim 6, wherein the management apparatus acquires respective path defining information and the respective coupling mode information for each of the storage apparatuses from the storage apparatuses and stores the respective path defining information and the respective coupling mode information acquired for the storage apparatuses in the memory, and wherein the respective path defining information for each of the storage apparatuses indicates each currently set communication path for the storage apparatus.

8. The storage system of claim 7, wherein:

the first user interface displays a list of each currently set communication path for each of the storage apparatuses and provides input fields for receiving user input for modifying the respective path defining information for each of the storage apparatuses, and the second user interface displays the respective coupling mode information stored in each of the storage apparatuses and provides input fields for receiving user input for modifying the respective coupling mode information for each of the storage apparatuses.

9. The storage system of claim 8, wherein:

the second user interface permits changing the respective current coupling mode information of any of the storage apparatuses that indicates the second mode to indicate the first mode, the second user interface permits changing the respective current coupling mode information of any of the storage apparatuses that indicates the first mode to indicate the second mode when there are not a plurality of currently set communication paths for the storage apparatus, and the second user interface displays an error message indicating a coupling mode setting failure upon receiving user input for changing the respective current coupling mode information of any of the storage apparatuses that indicates the first mode to indicate the second mode when there are a plurality of currently set communication paths for the storage apparatus.

10. The storage system of claim 8, wherein:

the management apparatus acquires a respective permissible number of communication paths that may be set for each of the storage apparatuses from the storage apparatuses and stores the respective path defining information and stores the acquired respective permissible numbers of communication paths that may be set for the storage apparatuses in the memory, the first user interface permits setting of a communication path between any two of the plurality of storage apparatuses for which, at the time of setting the communication path, the respective coupling mode information stored in one of the two storage apparatuses indicates that the storage apparatus is in the first mode and the respective coupling mode information stored in the other of the two storage apparatuses indicates that the storage apparatus is in the second mode when the respective permissible numbers of communication paths that may be set for the two storage apparatuses are not set for the two storage apparatuses, the first user interface permits setting of a communication path between any two of the plurality of storage apparatuses for which, at the time of setting the communication path, the respective coupling mode information stored in each of the two storage apparatuses indicates that the storage apparatus is in the second mode when no communication path is currently set for either of the two storage apparatuses, the first user interface displays an error message indicating a path setting failure upon receiving a user input for setting of a communication path between any two of the plurality of storage apparatuses for which, at the time of setting the communication path, the respective coupling mode information stored in one of the two storage apparatuses indicates that the storage apparatus is in the first mode and the respective coupling mode information stored in the other of the two storage apparatuses indicates that the storage apparatus is in the second mode when the respective permissible numbers of communication paths that may be set for either of the two storage apparatuses is set for the storage apparatus, and the first user interface displays an error message indicating a path setting failure upon receiving a user input for setting of a communication path between any two of the plurality of storage apparatuses for which, at the time of setting the communication path, the respective coupling mode information stored in each of the two storage apparatuses indicates that the storage apparatus is in the second mode when a communication path is currently set for either of the two storage apparatuses.

* * * * *